United States Patent
English

(10) Patent No.: US 8,819,971 B2
(45) Date of Patent: Sep. 2, 2014

(54) DISPLAY ADS FOR DOOR HANDLES PROVIDING MULTISENSORY STIMULI

(71) Applicant: Wild August LLC, Deer Park, IL (US)

(72) Inventor: Larry English, Deer Park, IL (US)

(73) Assignee: Wild August LLC, Deer Park, IL (US)

( * ) Notice: Subject to any disclaimer, the term of this patent is extended or adjusted under 35 U.S.C. 154(b) by 41 days.

(21) Appl. No.: 13/826,523

(22) Filed: Mar. 14, 2013

(65) Prior Publication Data

US 2014/0137449 A1    May 22, 2014

Related U.S. Application Data

(63) Continuation-in-part of application No. 13/570,011, filed on Aug. 8, 2012, which is a continuation-in-part of application No. 13/540,534, filed on Jul. 2, 2012.

(60) Provisional application No. 61/729,200, filed on Nov. 21, 2012, provisional application No. 61/502,432, filed on Jun. 29, 2011.

(51) Int. Cl.
G09F 23/00    (2006.01)
F16B 33/00    (2006.01)

(52) U.S. Cl.
CPC .............. *G09F 23/00* (2013.01); *F16B 33/00* (2013.01)
USPC .................................................... 40/661.12

(58) Field of Classification Search
CPC ........ A45C 13/42; B26B 1/10; E05B 1/0084; G09F 3/14
USPC .................................................... 40/661.12
See application file for complete search history.

(56) References Cited

U.S. PATENT DOCUMENTS

| 2,383,881 | A |   | 8/1945  | Murphy |
|-----------|---|---|---------|--------|
| 2,795,527 | A |   | 6/1957  | Heyer |
| 3,894,707 | A |   | 7/1975  | Heard |
| 4,300,299 | A |   | 11/1981 | Batky et al. |
| 4,344,244 | A |   | 8/1982  | Tyke |
| 4,408,922 | A |   | 10/1983 | D'Alessio |
| 4,548,377 | A |   | 10/1985 | Huel |
| 4,729,183 | A | * | 3/1988  | Tarter et al. ..................... 40/766 |
| 4,955,153 | A |   | 9/1990  | Albrecht et al. |
| 5,189,822 | A | * | 3/1993  | Schmanski et al. ........ 40/611.05 |

(Continued)

FOREIGN PATENT DOCUMENTS

GB    176590    3/1992

OTHER PUBLICATIONS

Patent Cooperation Treaty, International Search Report (PCT Article 18 and Rules 43 and 44), International application No. PCT/US 13147048, Feb. 21, 2014.

*Primary Examiner* — Charles A. Fox
*Assistant Examiner* — Shin Kim
(74) *Attorney, Agent, or Firm* — Flachsbart & Greenspoon, LLC

(57) ABSTRACT

A display ad system for door handles may include electronics that provide multisensory stimuli. In one embodiment, an end cap includes light and sound triggered by a motion detector. In another embodiment, an end cap includes fan-directed aromas triggered by a motion detector. In a third embodiment, a flexible grid of LED lights backlights the display ad in any time sequence desired, and may be motion-triggered as well. A door handle embodiment may also provide a note board surface as an alternative to showing display ads.

14 Claims, 26 Drawing Sheets

(56) References Cited

U.S. PATENT DOCUMENTS

| | | |
|---|---|---|
| 5,417,458 A | 5/1995 | Best |
| 5,428,913 A | 7/1995 | Hillstrom |
| 5,560,131 A | 10/1996 | Gibson |
| 5,590,504 A | 1/1997 | Heard et al. |
| 6,092,841 A | 7/2000 | Best |
| 6,119,385 A | 9/2000 | Olivier |
| 6,186,454 B1 | 2/2001 | Olsen |
| 6,241,287 B1 | 6/2001 | Best |
| 6,364,099 B2 | 4/2002 | Emoff |
| 6,411,215 B1 | 6/2002 | Shnier |
| 6,481,811 B1 | 11/2002 | Marsh |
| 6,525,659 B2 | 2/2003 | Jaffe et al. |
| 6,550,170 B1 | 4/2003 | Cooper et al. |
| 6,948,272 B1 | 9/2005 | Olivier et al. |
| 7,216,447 B2 * | 5/2007 | Bateman ............... 40/618 |
| 7,383,654 B2 | 6/2008 | Olivier et al. |
| 7,588,224 B2 | 9/2009 | Bates et al. |
| 7,762,022 B2 | 7/2010 | Stadler et al. |
| 7,784,208 B2 | 8/2010 | Thompson |
| 7,895,778 B2 * | 3/2011 | Jay ............... 40/308 |
| 7,946,547 B2 | 5/2011 | Bernstorf et al. |
| 8,096,067 B2 * | 1/2012 | Jay ............... 40/320 |
| 8,336,837 B2 | 12/2012 | Gephart et al. |
| 8,376,298 B2 | 2/2013 | McPheeters |
| 8,528,939 B2 | 9/2013 | Turner |
| 2001/0013186 A1 | 8/2001 | Malitas |
| 2007/0253208 A1 | 11/2007 | Howard et al. |
| 2008/0235911 A1 | 10/2008 | Olivier |
| 2010/0154265 A1 | 6/2010 | Poulokefalos |
| 2010/0236111 A1 | 9/2010 | Cheetwood |
| 2014/0053440 A1 * | 2/2014 | English ............... 40/599 |
| 2014/0137449 A1 * | 5/2014 | English ............... 40/599 |

* cited by examiner

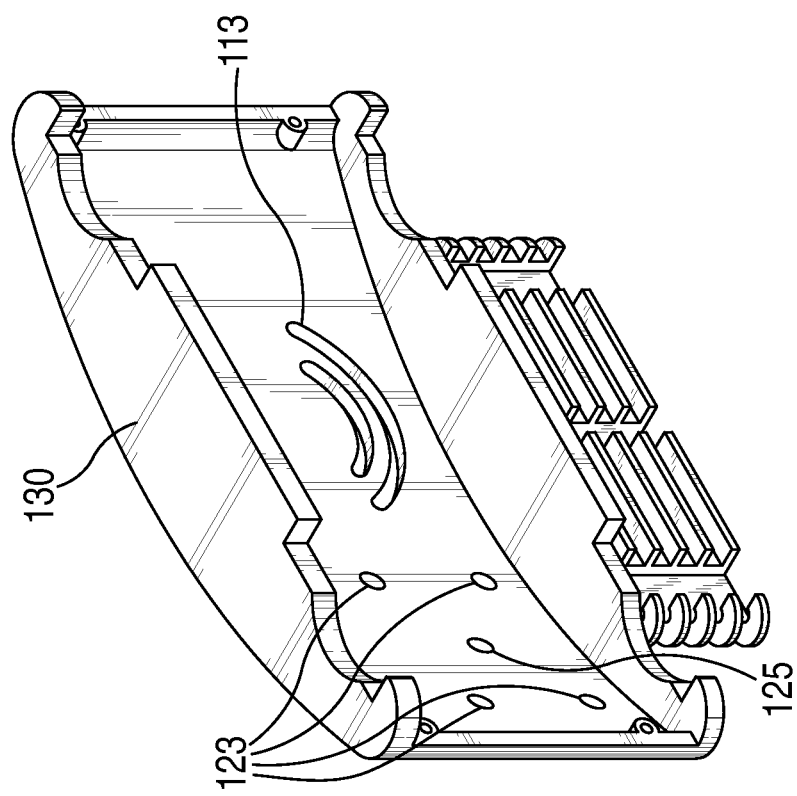

DISPLAY ADS FOR DOOR HANDLES PROVIDING MULTISENSORY STIMULI

This application claims the benefit of U.S. Provisional Application No. 61/729,200, filed Nov. 21, 2012, and is a continuation-in-part of U.S. patent application Ser. No. 13/570,011, filed Aug. 8, 2012, which is a continuation-in-part of U.S. patent application Ser. No. 13/540,534, filed Jul. 2, 2012, which claims the benefit of U.S. Provisional Application No. 61/502,432, filed Jun. 29, 2011. This application hereby incorporates by reference each of these applications in their entirety.

TECHNICAL FIELD OF THE INVENTION

The present invention relates generally to display advertising surfaces, and more specifically to assemblies that are added to or combined with pre-existing door handles. It also relates to electronic devices to make such assemblies more effective. It also relates to use of the relevant surfaces for erasable notes and memos, as an alternative to display advertising.

BACKGROUND OF THE INVENTION

The placing of display advertisements near consumer shelf space is generally known. Of late, retailers and advertisers have placed display ads on surfaces associated with the door handles of refrigeration coolers. For example, U.S. Pat. No. 7,383,654 describes an assembly that replaces entirely a cooler door handle, such as on the cooler aisle of a grocery or convenience store. On the assembly, there is a surface within a cavity that allows the interchanging of graphic displays, including advertisements. The assembly is mounted directly to the door itself after the pre-existing handle is removed.

There are several advantages to these kinds of assemblies. They allow ads to receive consumer attention at or near the moment of purchase. They also allow for quick and easy advertisement changes.

What is needed is an assembly that does not require replacement of a door handle. What is also needed is a capacity to mate a display advertising surface with the wide variety of legacy door handles that currently exist at retail point of sale locations. What is further needed is a capacity to mate a display advertising surface with a door handle type that does not permit a bracket to surround its axis for the full three hundred sixty degrees. What is further needed is electronic apparatus that supplies visual, audible and/or olfactory stimuli to make the display advertising surfaces more effective.

It is also known that consumers have long installed stainless steel appliances in their homes. One aspect of such appliances is that the fronts do not attract magnets, at least to the extent that previous metallic appliances did. Where consumers used to be able to attach notes, grocery lists or other papers to fronts of their appliances such as refrigerators, they are generally no longer able to do so with stainless steel versions. What is needed is the ability to add a marking surface to the front of an appliance.

SUMMARY OF THE INVENTION

The present invention eliminates the drawbacks of preexisting assemblies. In the embodiments described below, the invention includes bracket clips designed and shaped for pre-existing legacy cooler door handles. In three of the embodiments below, the bracket clips are for handles that allow a full three hundred sixty degree wrap-around. In a fourth embodiment, the bracket clip is for handles that do not permit such a wrap-around, for example a full-length L-bar. Electronically-generated stimuli can be added, such as lights, sounds or smells. Other features and advantages of the present invention will become apparent from the detailed description below.

In another aspect, the present invention supplies a marking surface to the front of an appliance, such as a consumer's refrigerator door. Many of the ideas used for attaching display advertising assemblies to commercial cooler doors can be used to attach a marking surface to a consumer's refrigerator door. The marking surface should be illuminated in night lighting. Other features and advantages of this additional embodiment of the present invention will become apparent from the detailed description below.

BRIEF DESCRIPTION OF THE DRAWINGS

FIG. 20 is a view of the inside surface of the front of the electronic end cap of the present invention.

DETAILED DESCRIPTION

The present invention is described below in its various embodiments and configurations. The description is not intended to be limiting, and instead the appended claims alone describe the metes and bounds of the rights under the present invention.

A. Ad Handles

Figure 1:
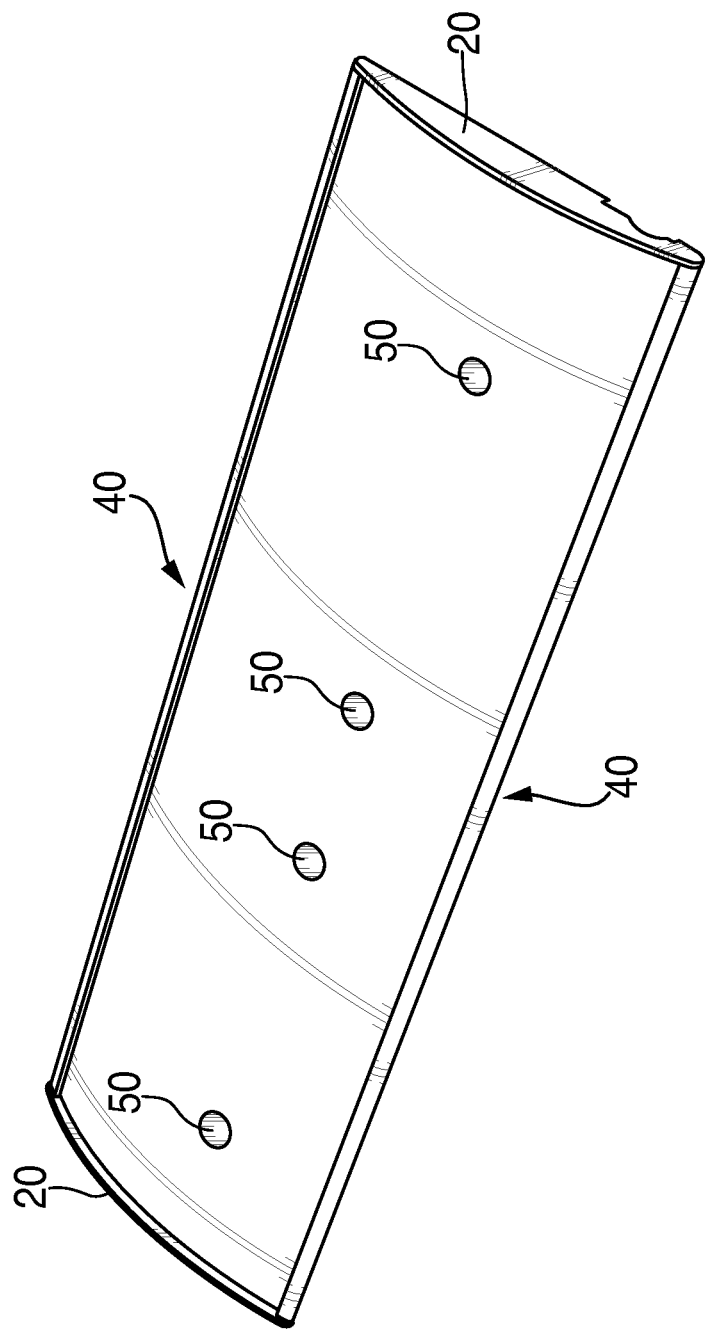
FIG. 1 is an elevation view of the front of a fully assembled display assembly, minus any display insert.

FIG. 1 shows an elevation view of the front of a fully assembled display assembly 10, minus any display insert. There is a top end cap 20 and a bottom end cap 30 inserted into the respective top and bottom of the display assembly. The display assembly 10 is generally rectangular, and in this embodiment has a convexly curved surface. Along each side of the curved surface is a lip flange 40. When one of the end caps is removed (e.g., the top), a display ad and its optional clear flexible cover (e.g., of thin transparent plexiglass) may be inserted into the display assembly. The end cap is then replaced. The display ad is thereby held in by the lip flange 40 and the respective end caps 20, 30. FIG. 1 also shows apertures 50 for receiving fastening screws 55 for the various kinds of brackets, to be described below.

Figure 2:
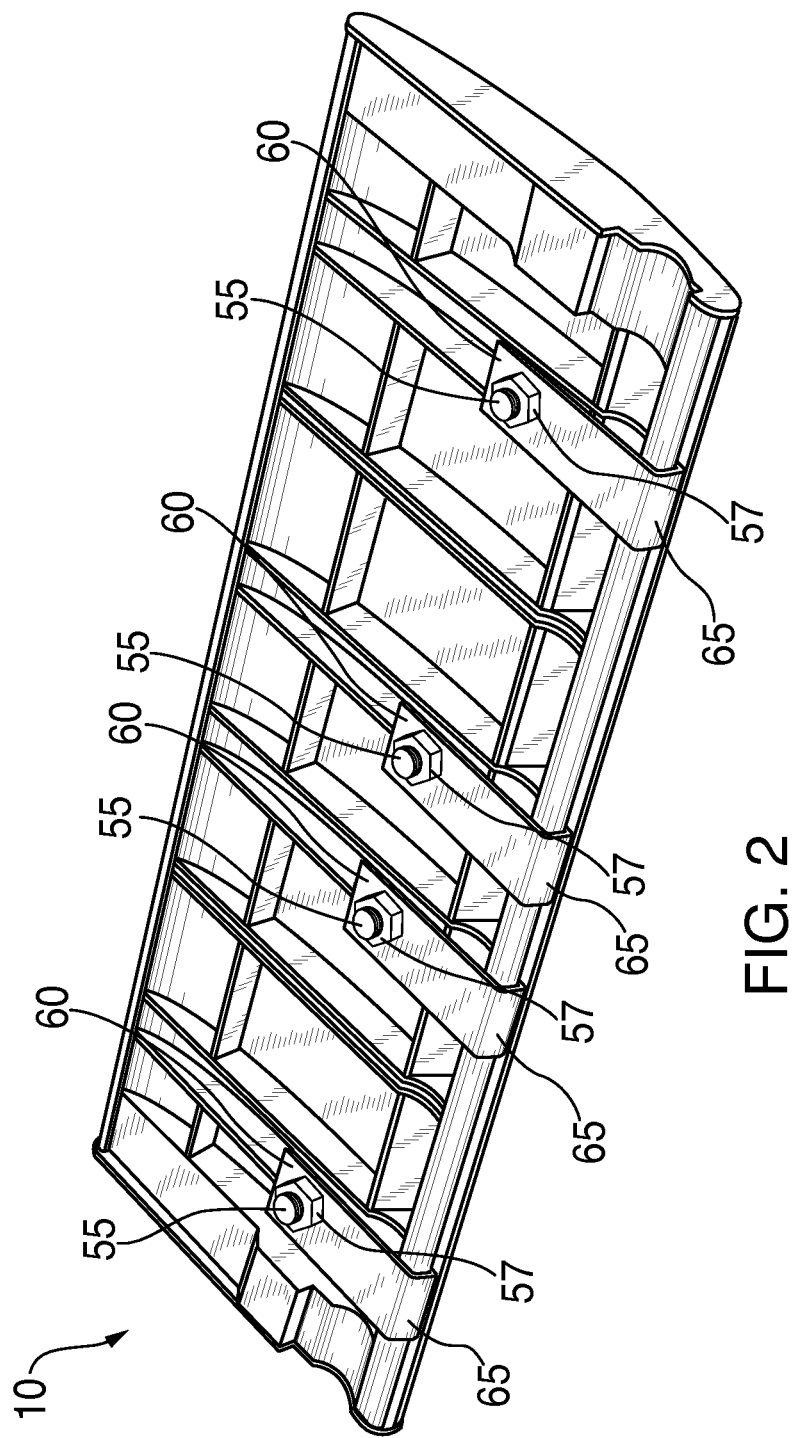
FIG. 2 is an elevation view of the rear of a fully assembled display assembly using a first bracket type to surround a first type of legacy handle.
Figure 9:
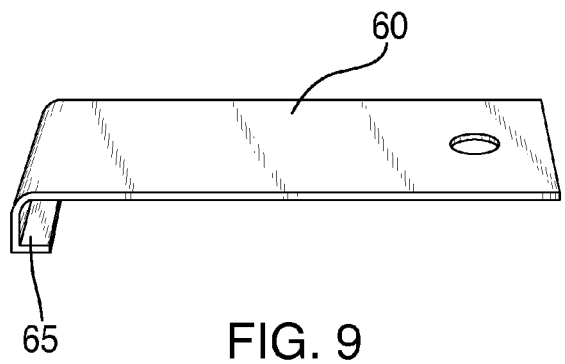
FIG. 9 is a perspective view of the individual brackets for the embodiment of FIGS. 2 and 5.

FIG. 2 is an elevation view of the rear of a fully assembled display assembly 10 using a first bracket type to surround a first type of legacy handle (namely, certain cooler handles by manufacturers Anthony and Ardco). The specific brackets 60 for this embodiment are more fully disclosed in FIG. 9, and are seen to be generally flat, with a J-shaped slot-fitting end 65. Opposite the slot-fitting end 65 is an aperture for receiving the above-mentioned fastening screw 55.

Figure 3:
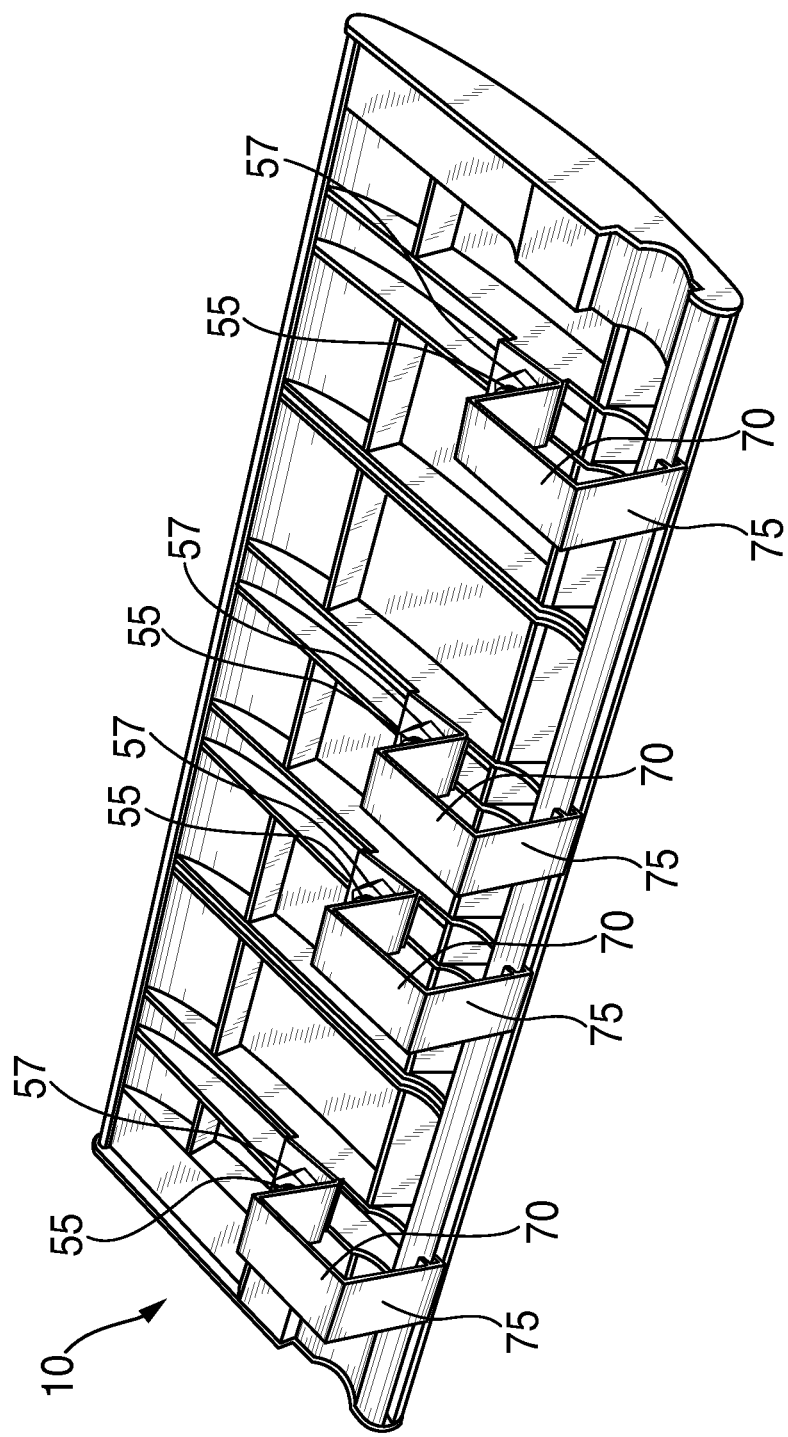
FIG. 3 is an elevation view of the rear of a fully assembled display assembly using a second bracket type to surround a second type of legacy handle.
Figure 10:
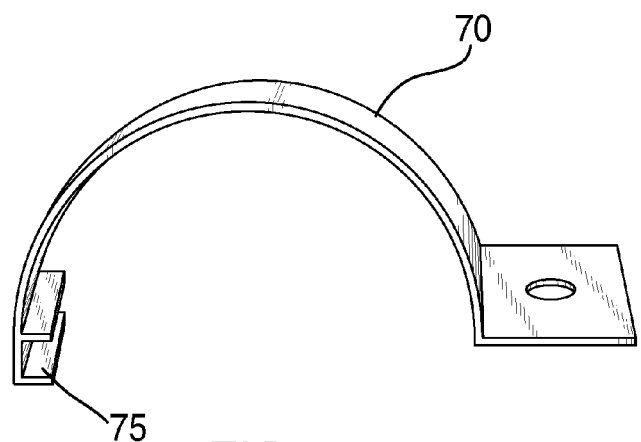
FIG. 10 is a perspective view of the individual brackets for the embodiment of FIGS. 3 and 6.

FIG. 3 is an elevation view of the rear of a fully assembled display assembly 10 using a second bracket type to surround a second type of legacy handle (namely, certain cooler handles by manufacturer Anthony, particularly more recent models). The specific brackets 70 for this embodiment are more fully disclosed in FIG. 10, and are seen to form a generally rectangular open shape, with a slot-fitting end 75. Again, opposite the slot-fitting end 75 is an aperture for receiving the above-mentioned fastening screw 55.

Figure 4:
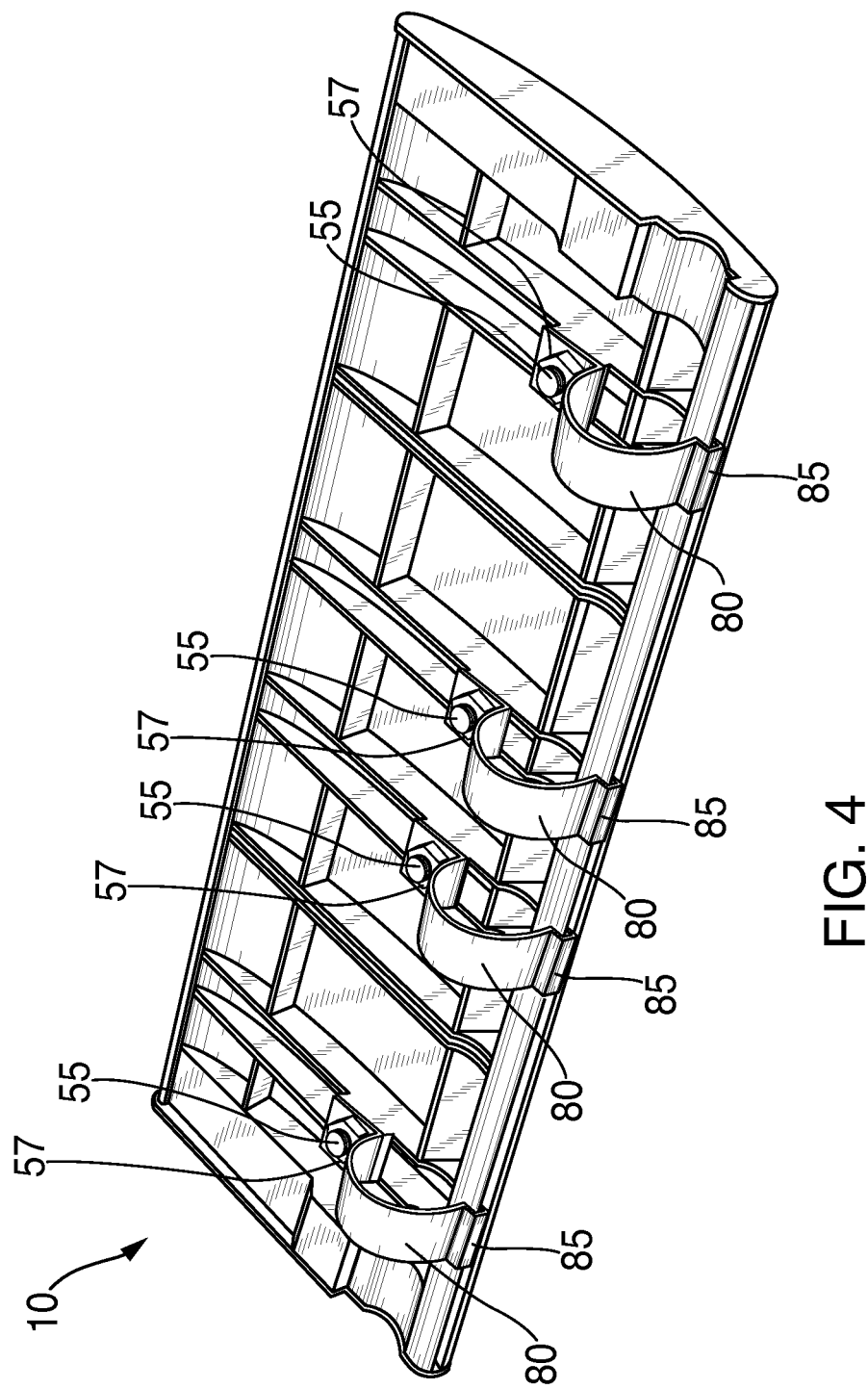
FIG. 4 is an elevation view of the rear of a fully assembled display assembly using a third bracket type to surround a third type of legacy handle.
Figure 11:
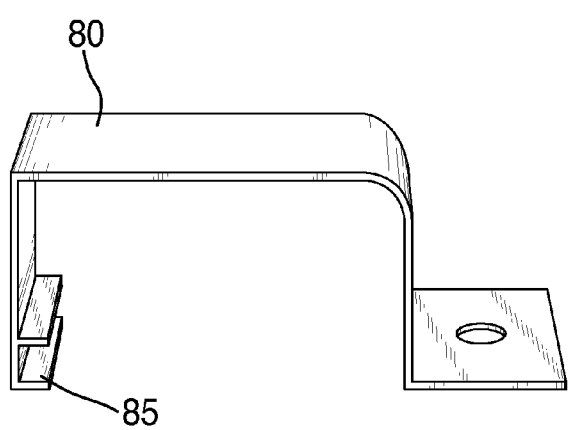
FIG. 11 is a perspective view of the individual brackets for the embodiment of FIGS. 4 and 7.

FIG. 4 is an elevation view of the rear of a fully assembled display assembly 10 using a third bracket type to surround a third type of legacy handle (namely, certain cooler handles by manufacturer Hussman). The specific brackets 80 for this embodiment are more fully disclosed in FIG. 11, and are seen to form a generally rounded, open C-shape, with a slot-fitting end 85. Again, opposite the slot-fitting end 85 is an aperture for receiving the above-mentioned fastening screw 55.

Figure 5:
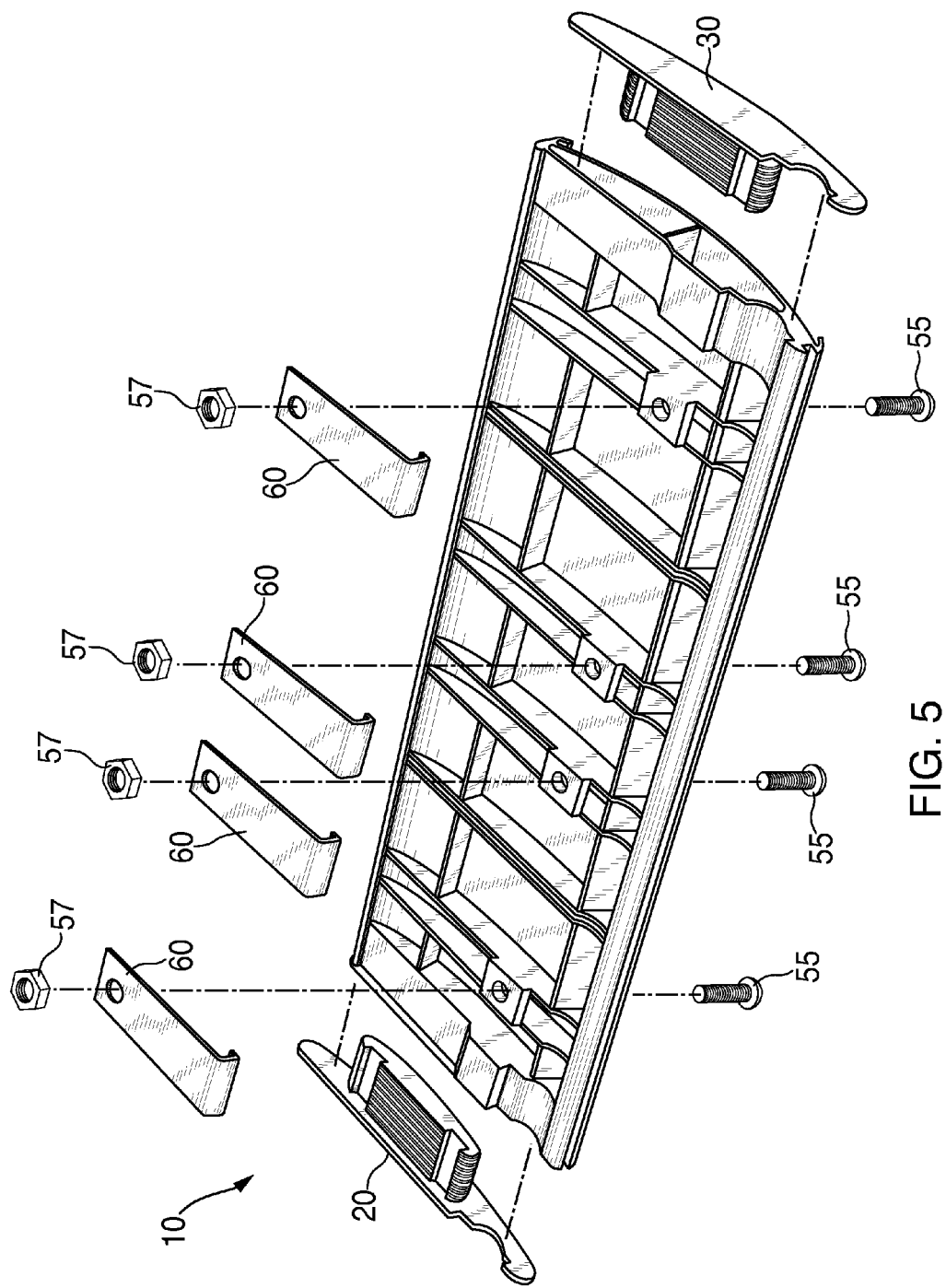
FIG. 5 is an exploded rear view of the assembly of FIG. 2.
Figure 6:
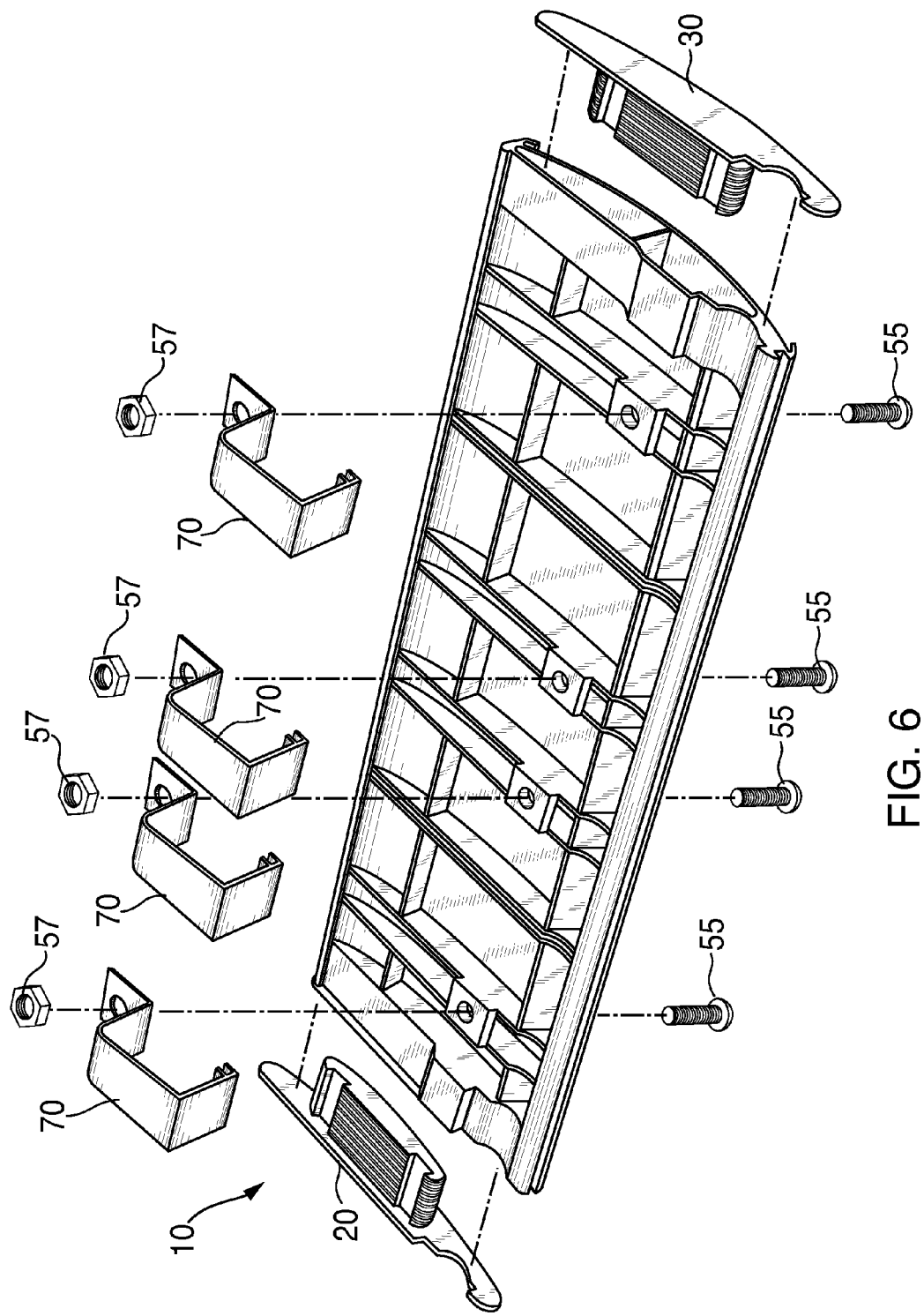
FIG. 6 is an exploded rear view of the assembly of FIG. 3.
Figure 7:
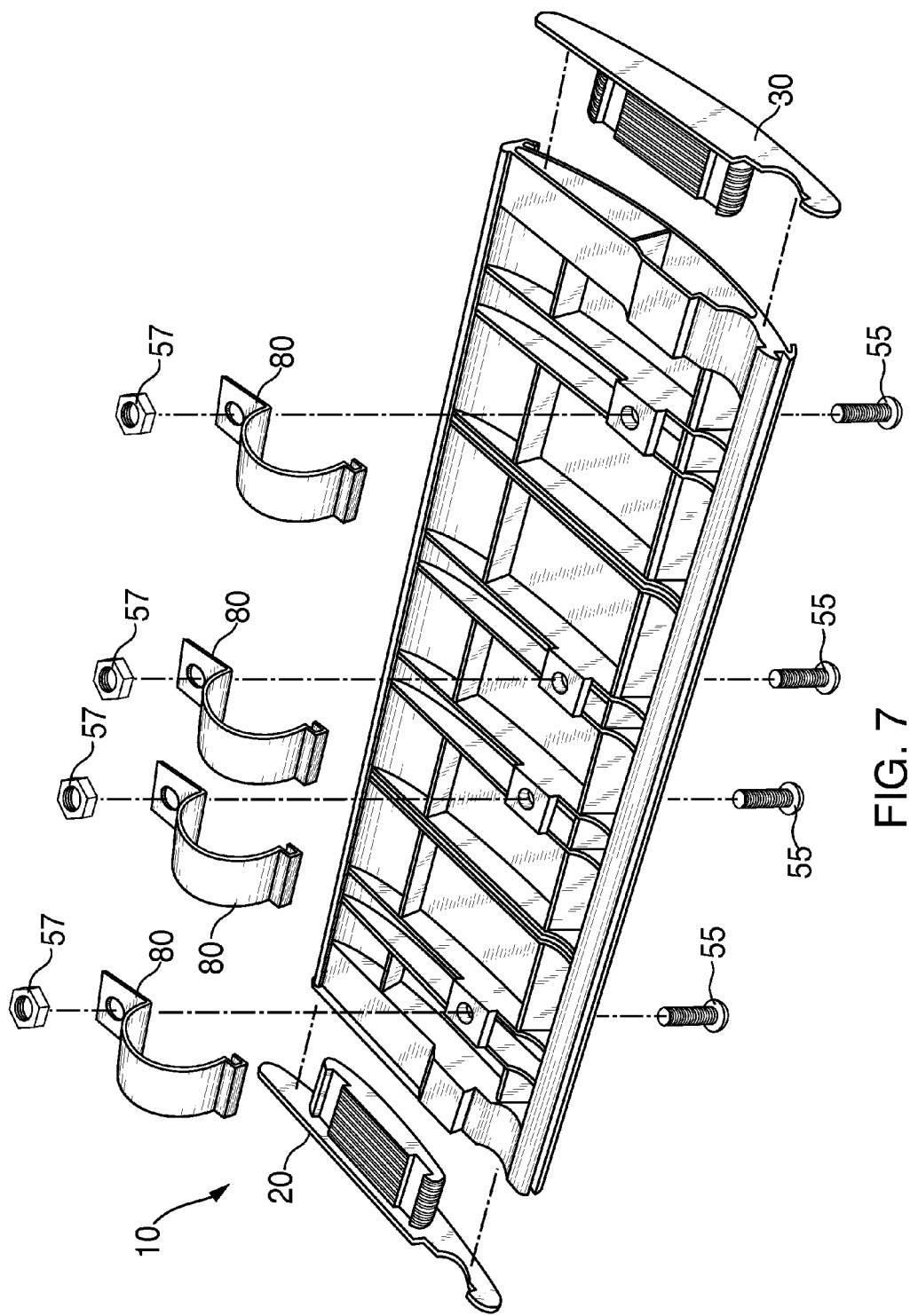
FIG. 7 is an exploded rear view of the assembly of FIG. 4.

FIGS. 5, 6 and 7 show perspective views depicting how the brackets 60, 70, 80 are attached to the display assemblies 10 of the present embodiments. The apertures on the front of the display assembly are larger than the ones on the back, such that a fastening screw 55 will pass completely through the front into the inner volume, so that its head rests flush against the back aperture. Then the respective bracket 60, 70, 80 is placed over the screw body, and the fastening nut 57 installed. In this way, a retailer or advertiser may easily install the display assembly 10 around the legacy door handle using conventional tools (such as a screwdriver and a wrench or needle pliers). Once installed, a consumer would pull on the display assembly 10 to open a cooler door, usually while looking right at it and its inserted-ad.

Figure 8:
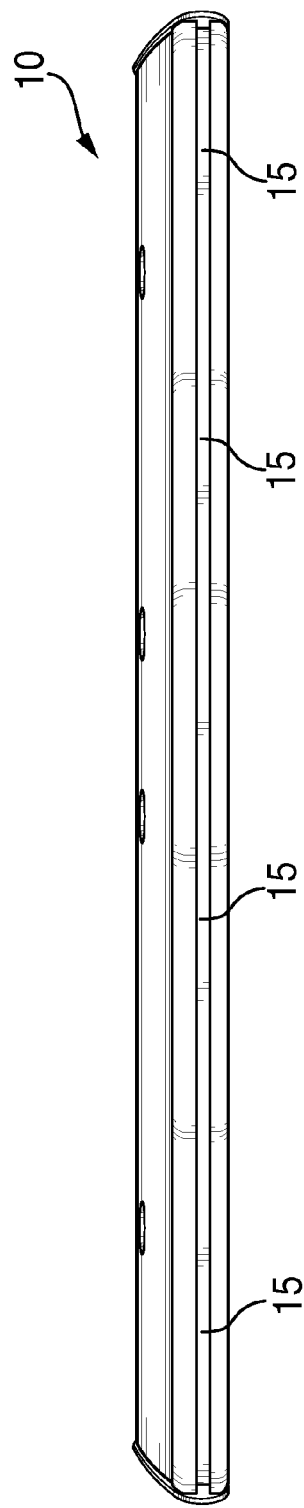
FIG. 8 is a side view of the assembly of the present invention.

FIG. 8 shows a side view of the display assembly 10, indicating where the slots 15 are for receiving the slot-fitting end 65, 75, 85 of the various brackets. It will be apparent that to affix the brackets 60, 70, 80, the slot-fitting end 65, 75, 85 is inserted into its slot, and then the screw 55 and bolt 57 are connected from the front to complete the connection. For the embodiments described so far, the final assembly will completely surround the legacy door handle.

Figure 12:
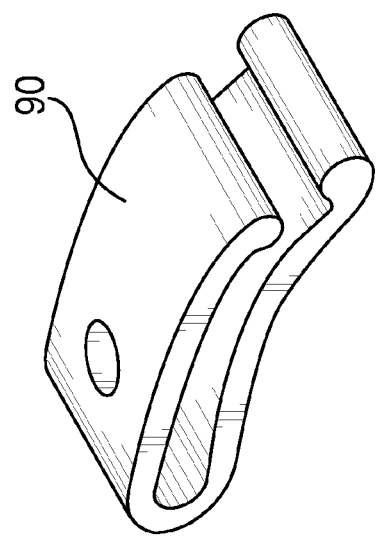
FIG. 12 is an elevation view of a different type of compatible bracket, for use as a clamp where a cooler door cannot be completely surrounded.

FIG. 12 is an elevation view of a different type of compatible bracket 90, for use as a clamp where a cooler door handle cannot be completely surrounded. It is assembled in the same way as the above-mentioned brackets, but results in an open tension-clamp, having bulbous ends. The embodiment of FIG. 12 is particularly useful for cooler door handle types like the full-length handles that may exist on the Anthony Model 101 cooler. Such handles are an L-shaped member running from top to bottom of the door, and thus do not allow brackets to completely surround them.

Figure 13:
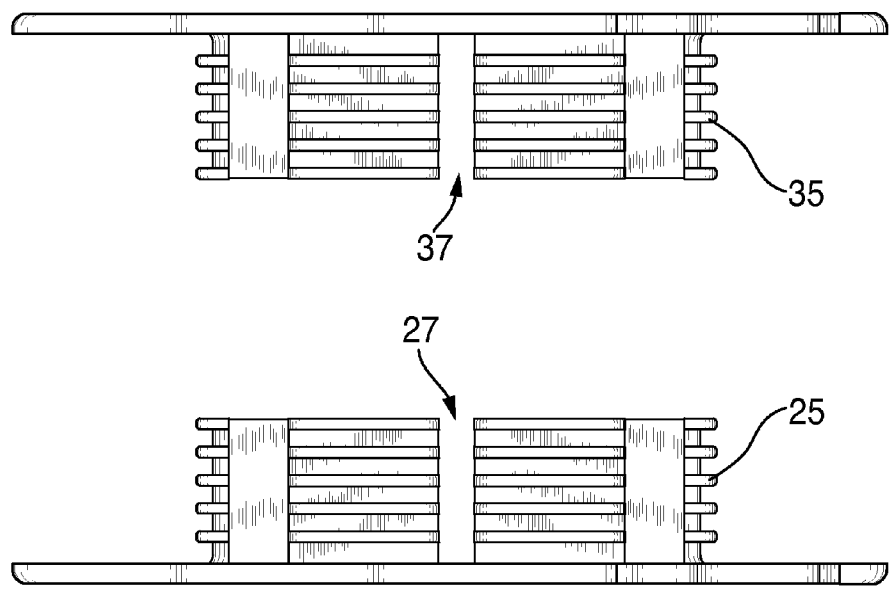
FIG. 13 is a side view of each end cap of the assembly of the present invention.
Figure 14:
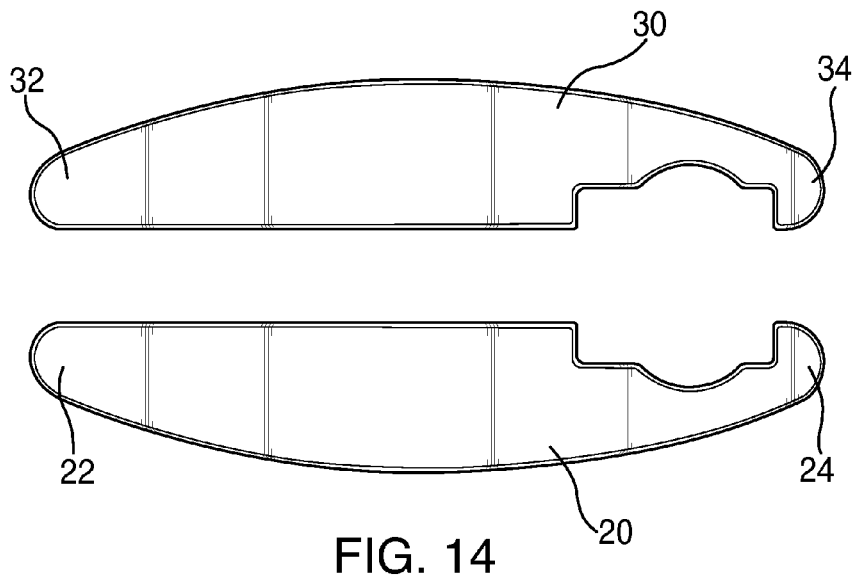
FIG. 14 is a top view of each end cap of the assembly of the present invention.

FIGS. 13 and 14 show, respectively, side and top views of the respective end caps (top 20 and bottom 30). These end caps 20, 30 are shaped asymmetrically to generally match the curved, asymmetrical cross section of the display assembly volume. They are inserted using a friction-fit. They each have two ends—distal 22, 32 from the bracket side, and proximal 24, 34 to the bracket side. Each end has projecting fin planes 25, 35 sized to allow a friction fit into the display assembly. Between the fin planes is an opening 27, 37 to allow passage into the volume of the display assembly, without interfering with a structural bar within such volume. The end caps may optionally be expanded in length, and fitted with electronics to provide battery-powered lighting displays, and/or sounds. Such lighting and sounds may be activated by proximity sensors, or by any other known means. In this way, the end caps may contribute even greater attention-attraction to the display assembly of the present invention.

Figure 15:
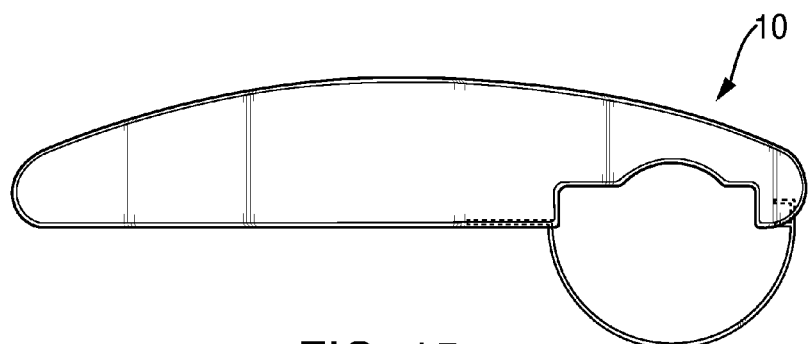
FIG. 15 is a top view of the assembly.
Figure 16:
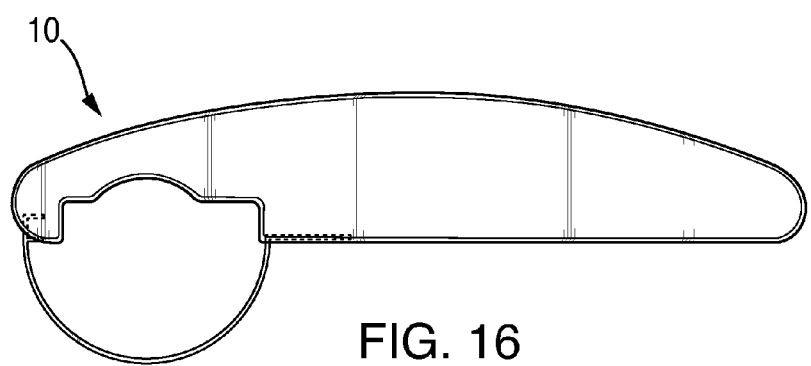
FIG. 16 is a bottom view of the assembly.

FIGS. 15 and 16 show, respectively, top and bottom views of the fully assembled display assembly 10. The asymmetry of the cross section, and its curvature from the proximal to the distal ends, are clearly indicated.

Figure 17:
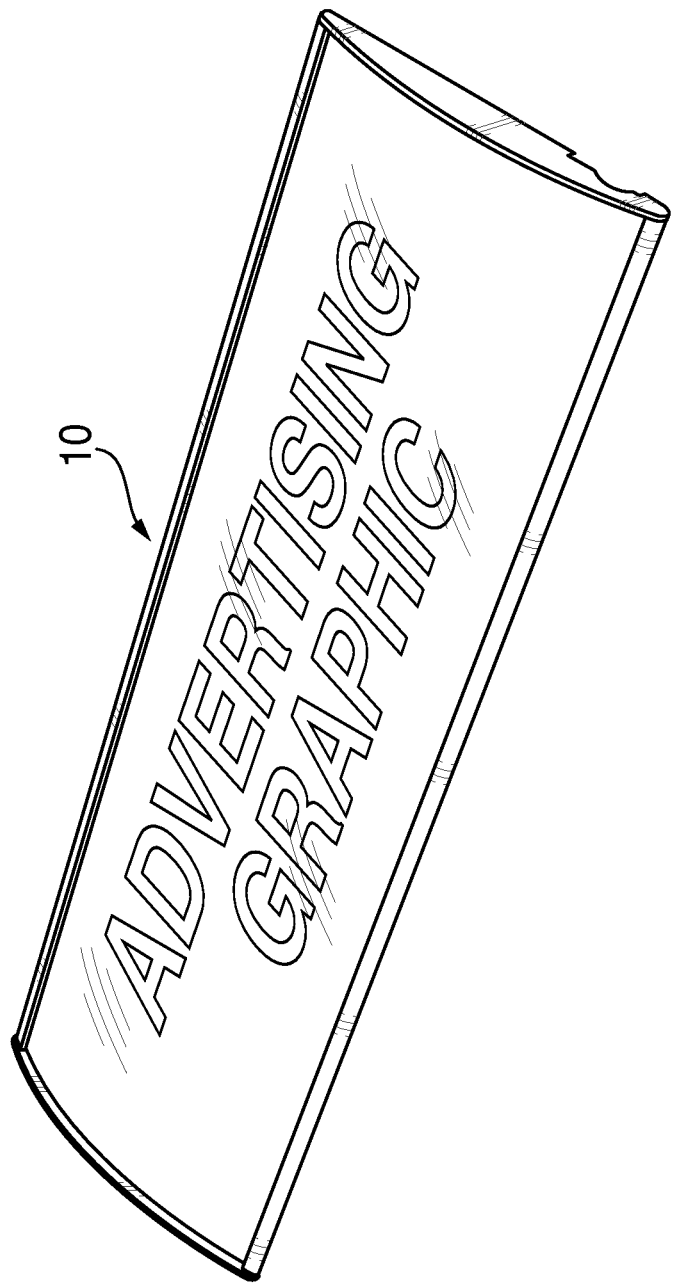
FIG. 17 is the assembly of FIG. 1, showing an exemplary display ad fully inserted.

FIG. 17 shows an elevation view of the front of the fully assembled display assembly 10 of the present invention, now equipped with an actual display ad. The display ad may be removed and replaced as desired by removing one of the end caps, and sliding the graphic material in and out over the front curved surface and under the lip flange. It will be appreciated that insertion of a display advertisement blocks any view of the screw apertures and screw head.

The display assembly 10 may be made of any suitable stiff material. Examples include aluminum or plastic. If made from plastic, ribbing across the rear may advantageously provide additional stiffness (as shown in the rear views of the figures described above). If made from aluminum, such ribbing is advantageously left off.

The display assembly 10 may also be supplied with an adhesive (not shown) applied to the curved part of assembly 10 that would cooperate with the brackets to enclose a pre-existing door handle. That location could be, for example, the part of assembly 10 along the bottom of FIGS. 2-7 just interior to the edge. An installer would then perform the following steps to install the assembly 10: (1) remove any paper covering the adhesive, (2) stick the assembly onto the preexisting handle in the desired orientation (where such sticking helps stabilize the piece during the attachment process), (3) insert screws 55 into the front of at least two of the apertures 50, (4) place the appropriate brackets into the rear of the assembly 10 and its proper slots 15 to pass the bracket apertures over the screw body, and (5) tighten nuts 57 across the open screw body as necessary to complete the assembly. The brackets themselves may also optionally have paper-covered adhesive (not shown) which, when the paper is removed, will the pieces during the assembly process. When a display add is thereafter inserted, the screw heads will be covered from view.

B. Electronic End Cap

FIGS. 18-22 depict an improvement to the end caps 20, 30. In the improvement, the end cap body is expanded and fitted with battery-powered electronics. These electronics permit a fully installed display assembly 10 to emit visual, audible, and/or olfactory stimuli. This has the advantage of making any display advertisement more likely to be seen, and thus more likely effective.

Figure 19:
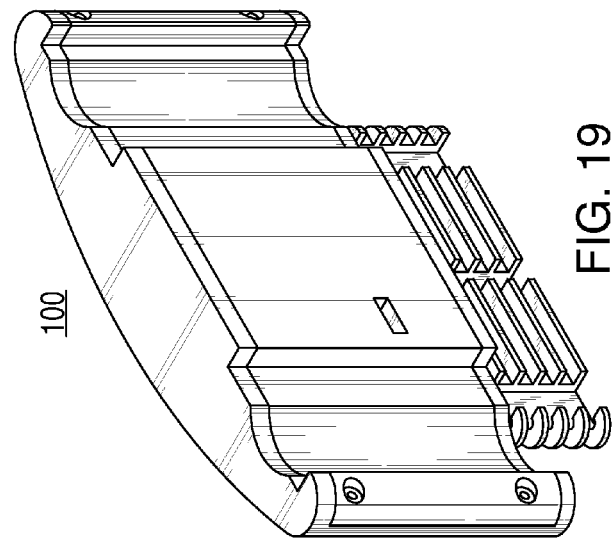
FIG. 19 is a view of the rear surface of the electronic end cap of the present invention.
Figure 18:
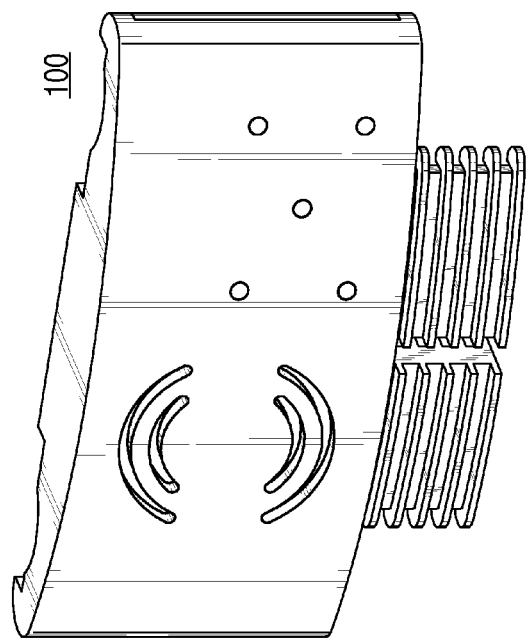
FIG. 18 is a view of the front surface of the electronic end cap of the present invention.

FIG. 18 shows the front of electronic end cap 100. Its general cross section is comparable to that of end caps 20, 30, including the fin planes that permit a friction fit into assembly 10. However, it is expanded in height so that its volume permits the addition of electronics. FIG. 19 shows the rear of electronic end cap 110. The rear contains a battery door for easy replacement of DC batteries.

Figure 21:
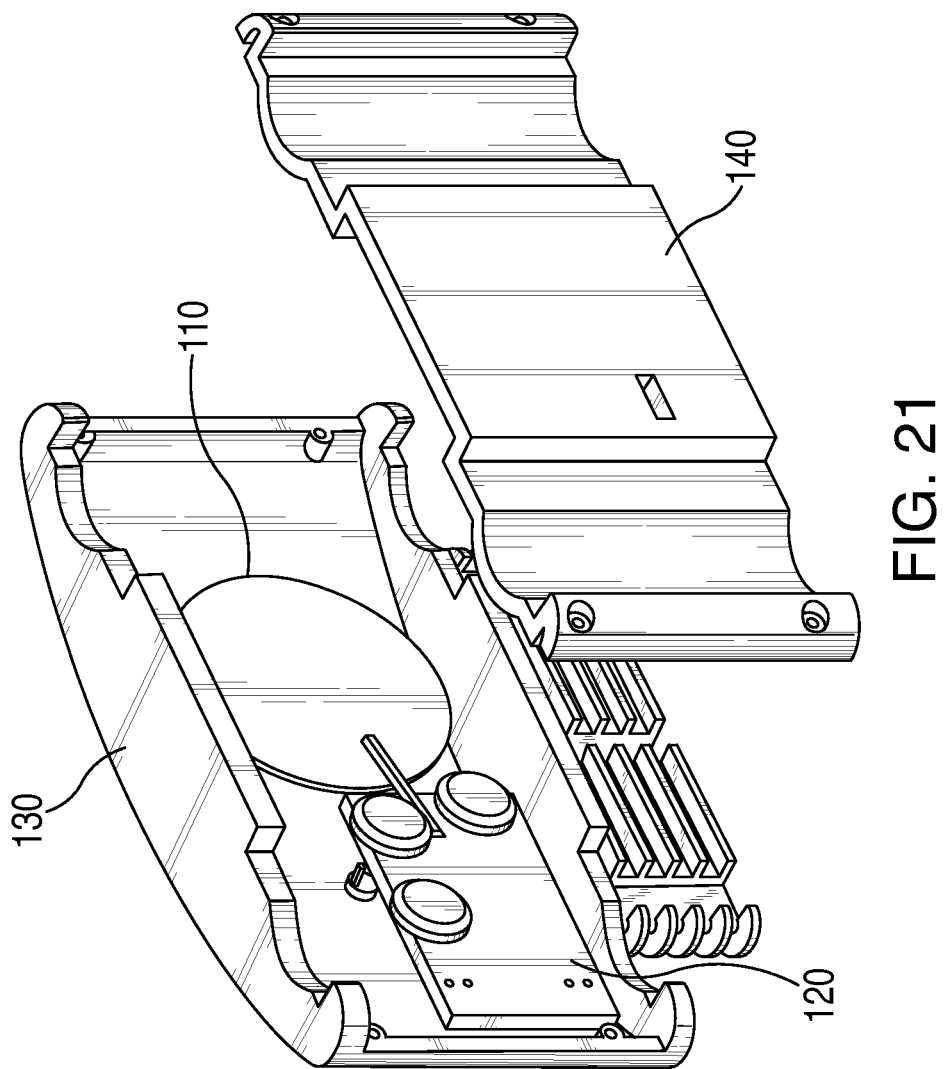
FIG. 21 is a view of the inside of the front of the electronic end cap of the present invention, as equipped with a circuit board and speaker.

The front 130 and back 140 of the housing for electronic end cap 100 are preferably separate pieces that are attached together. FIG. 20 shows the interior surface of front 130. Front 130 has four apertures 123 for the passage of light from LEDs, and one aperture 125 for the receipt of light by a photodiode acting as a motion detector (alternatively, an infrared detector may be used). Front 130 also has an opening 113 to pass the sound from a speaker. FIG. 21 shows front 130 installed with some of the aforementioned features, along with an exploded view of back 140. Notably, FIG. 21 shows speaker 110 and circuit board 120 installed in their proper spaces.

Figure 22:
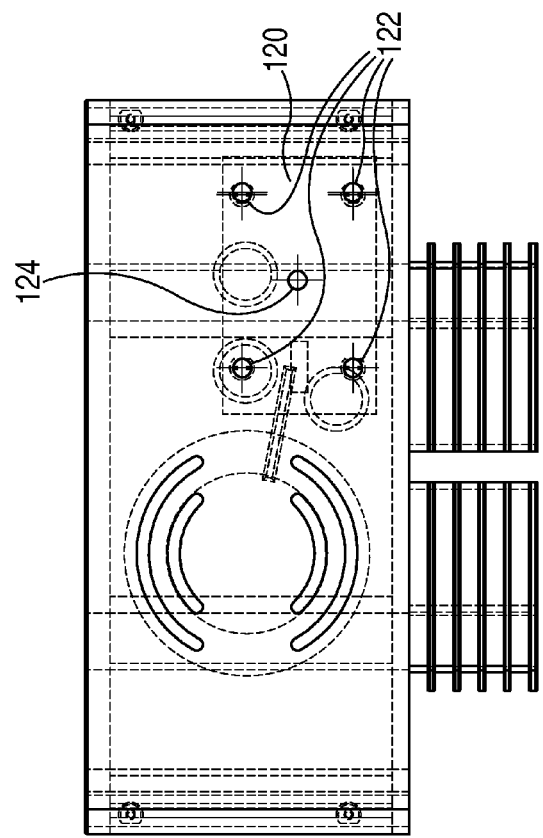
FIG. 22 is a see-through view of the interior of the electronic end cap of the present invention, as seen from the front.

FIG. 22 is a see-through view looking through front 130, as if the housing were transparent. It shows electronic end cap 100 fully equipped with speaker 110 and circuit board 120. Circuit board 120 contains red LEDs 122 for outputting light through the aforementioned apertures 123, and photodiode 124 for receiving light through the aforementioned aperture 125. Not shown here are wires from the battery contacts, or wires from a power switch. A power switch (not shown) is preferably situated on the top of electronic end cap 100, for example within a depression of a 2 mm diameter hole. Such a switch may be a spring biased pushbutton that is reached through the use of a small rod (not shown) or unwound paper clip (not shown).

Circuit board 120 operates under control of a controller chip (not shown) that governs its functionality, to be described here. The controller chip is made by Bollar International (HK) Ltd., of Hong Kong, China. Once batteries are loaded (e.g., three AAA type batteries) and the electronic end cap 100 is fully assembled, it may be used in place of (for example) top end cap 20. It will fit into the top of display assembly 10 as the top end cap. An optional lock screw (not shown) can be used to prevent theft. The small rod or unwound paper clip (not shown) can be used to push the power switch once. This switches on the electonic end cap 100. Advantageously, upon first activation, the four LEDs 122 will flash briefly to indicate power-up. At that point, all control is based on detection by photodiode 124. When light across the diode changes to create a sufficient change in electrical potential, the controller chip would "interpret" that change as motion crossing in front of display assembly 10. This can be assumed to be a person passing by. The sensitivity can be made so that the range of detection is 1 meter. The controller chip will then create whatever sensory stimuli are desired to attract the attention of the passerby. And such stimuli might run through a sequence after successive detections. For example, circuit board 120 can come preinstalled with audio data memory, such as for a .WAV file (though for all purposes here, a different audio file format may also be used, e.g., MP3). The audio can be music, speech, foley, sounds of nature, white noise, or any combination of the above as desired in the particular advertising context. Alternatively, circuit board 120, may contain a socket (not shown) for engagement of a memory card (e.g., a micro SD card) that contains the .WAV file. In this alternative embodiment, there would also be a slot in either front 130 or back 140 to cooperate with the socket for engagement of such a card. This would permit replaceability of the audio program.

In a further audio alternative, either front 130 or back 140 may contain a USB port socket. Circuit board 120 couples to this socket under control of the controller chip. The USB functionality governed by the controller chip works in either of two ways. First, when a user inserts a portable USB drive (e.g., a thumb drive) containing a single .WAV file, that .WAV file will automatically be identified as a sound file and will be downloaded onto circuit board 120 to replace the previous sound file. Second, when a user inserts a USB cable connected to a computing device, the computing device will allow deletion and replacement of the .WAV file (e.g., by appearing within a drive/folder on the computer's desktop that can be modified via the computer's operating system). The file being downloaded (in either case) should contain less than two minutes of audio, preferably less than one minute.

Whichever the case may be (either pre-installed audio, replaceable audio, downloadable audio), one advantageous sequence might be as follows:

A. LED flash—30 seconds on when detector is tripped.

B. Time out—30 seconds in which the stimuli will not activate.

C. Sound—30 seconds on when detector is tripped.

D. Time out—30 seconds in which the stimuli will not activate.

E. LED flash and sound—30 seconds when detector is tripped.

F. Time out—30 seconds in which the stimuli will not activate.

G. Sequence begins again.

To save battery life, a user of electronic end cap 100 would turn off the device with the same power switch used to turn the device on.

Figure 27:
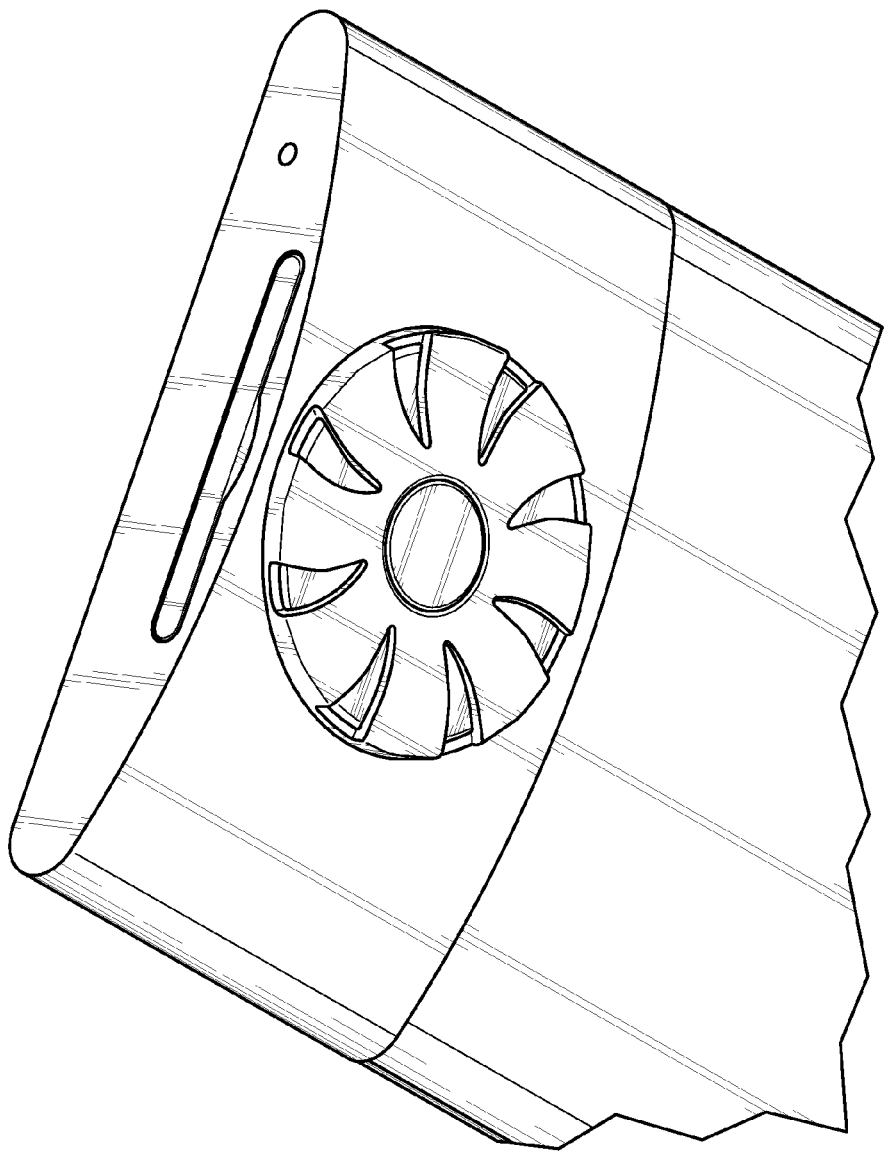
FIG. 27 is a front view of the electronic end cap of the present invention that generates olfactory stimuli.

While the aforementioned functionality describes light and sound, smell may also be used. In an optional embodiment shown in FIGS. 26 and 27, a small fan may be placed within electronic end cap 100. Just as there can be a slot in the housing for an optional .WAV card, there can also be a slot in the housing for an optional removable and replaceable smell-card. Such a slot would ensure that the smell card rests in front of the fan. The smell card would be impregnated with aromas appropriate for the desired advertising context. The housing for electronic end cap 100 would have venting to permit the operation of the fan to blow the aroma of the smell card outwardly away from display assembly 10. There can also be fan louvers or other structural means (e.g., an iris, a shutter, etc.) to minimize the amount of aroma that comes out when the fan is off. The three AAA batteries mentioned above would power the fan. However, to increase the amount of power available for the operation of the fan, and thus increase battery life, an aroma-equipped electronic end cap 100 may be powered by four to eight AA batteries built into the display assembly 10, such as those enclosed in a snap-connected wire harness in the rear (not shown).

In operation, controller would be programmed to activate the fan (and any desired louver/iris/shutter-engaging relays or motors) to emit aromas as part of an actuation sequence of the electronic end cap 100. From the foregoing, one of skill in the art would appreciate that virtually any desired combination of light flashes, sounds and smells, in virtually any desired sequence, can be actuated by a person or persons walking in front of display assembly 10 outfitted with electronic end cap 100.

C. Edge Lighting of Display Ad Surface

A different embodiment of the display assembly 10 would also use a motion detector as described above. In this case, the motion detector would serve to trigger the lighting of the display surface itself. One side of the lip flange 40 would be equipped with LEDs, pointed across the display ad surface (e.g., ten on one long side of the lip flange). To maintain attractiveness, the LEDs would shine through apertures in the lip flange 40. Those LEDs would be electrically connected to a controller, such as that described above with respect to the electronic end cap 100. Battery power can come from a side panel in the housing of display assembly 10, giving easy access for making battery changeouts. In addition, the convex front surface of display assembly 10 would contain a flexible matt, mesh or grid of LED lights. Those lights when activated would light up the transparent or translucent parts of a display ad creative.

In operation, the lighting discussed below attracts attention to an otherwise stagnant piece of paper advertising. The lighting can be sequenced using a motion detector, much as the electronic end cap 100 does. The lighting design can be programmed and customized in conjunction a specific display ad design. That is, desired parts of a display ad may be lit from behind in any time sequence that might be desired. For instance, a colorful display ad might have white translucent areas denoting a two word brand name. A designer might program the controller to activate selected ones of the mesh of LEDs to lighten the first word of the brand for 1 second, turn that word off and then lighten the second word of the brand for 1 second. In one example, there can be eight different lighting sequences. Within each lighting sequence, there can be up to seven changes in the lights' on-off state—56 possible light combinations total. The flexible LED matt and its controller are made by EL Lighting and Top Right Opto-Electronics of Zhuhai and Hong Kong, China.

D. Note Board Assembly for Refrigerator Doors

Many of the teachings of the foregoing embodiments have been incorporated into the note board assembly 200 of the present invention. The note board assembly 200 is primarily (though not necessarily exclusively) a consumer based item enabling the keeping of notes on today's modern refrigerators. The current trends are for laminates and stainless steel, which do not allow for kitchen magnets to be used for notes and lists. Note board assembly 200 is constructed as a plastic injected unit, and attaches to virtually any refrigerator handle through the use of the bracket and/or clip system described above with regard to display assembly 10.

Figure 23:
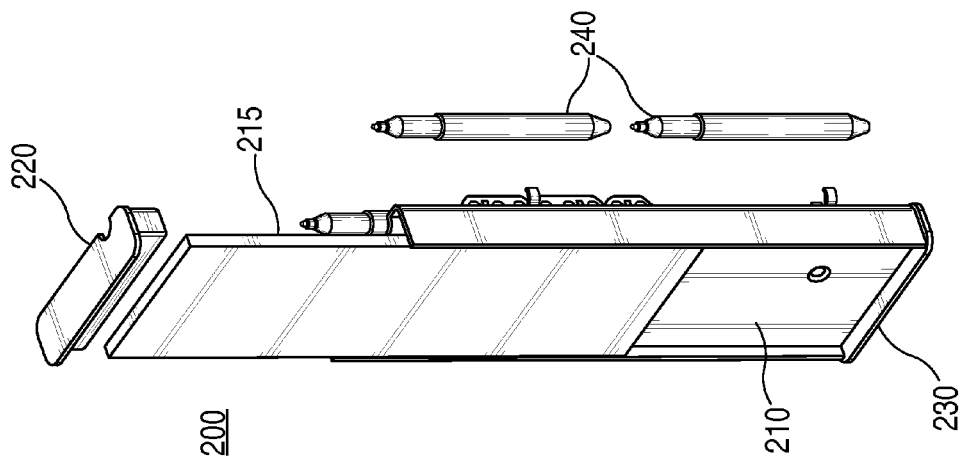
FIG. 23 is an exploded view of the note board assembly of the present invention.

FIG. 23 shows an exploded view of note board assembly 200. Unlike display assembly 10, note board assembly 200 has a flat outer surface for its housing 210. Like display assembly 10, there are end caps 220 and 230. Unlike display assembly 10, the slide-in material is board surface 215, rather than a plexiglass-fronted display ad. Pens 240 would be affixable in the back of housing 210, and are contemplated to be wet-erase fluorescent marker pens, for example, model 14075 from Sanford Expo.

Two contemplated embodiments for board surface 215 are (A.) a black wet erase board such as that made by Sanford Expo, and (B.) an LED sidelit board of hard clear acrylic with black backing (with side-lighting in accordance with the teachings described above for a different embodiment) such as that made by Flashing Boards. The LED lighting for embodiment B is battery powered. With the use of the flouresecent marking pens, the LED side lighting gives a brilliant and wet erasable message area. Side lighting is accomplished with motion detection (in accordance with the teachings described above for a different embodiment). Alternatively, side lighting can be accomplished with sound detection using a microphone apparatus (not shown). Motion-detected light activation works well in both daylight and dark, allowing the note board assembly 200 to be used as a night light for the kitchen area.

Figure 25:
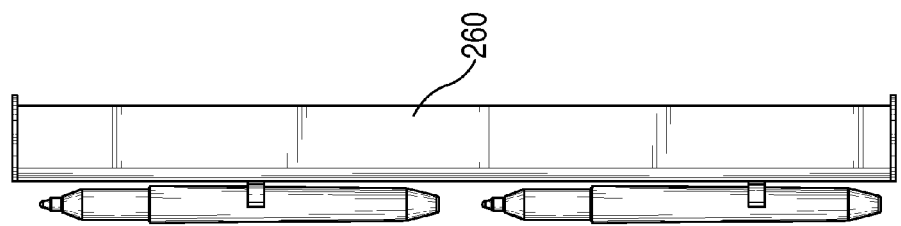
FIG. 25 is a side view of the note board assembly of the present invention.
Figure 24:
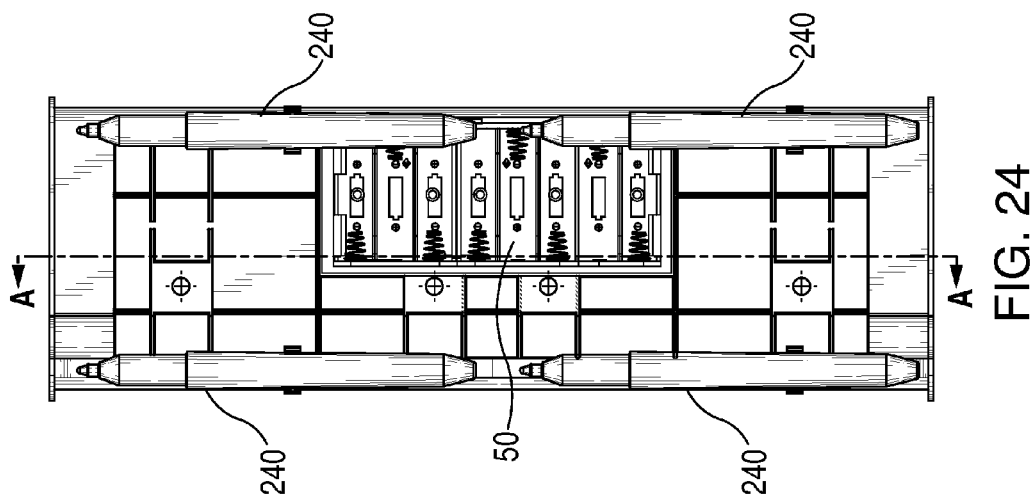
FIG. 24 is a rear view of the note board assembly of the present invention.
Figure 26C:
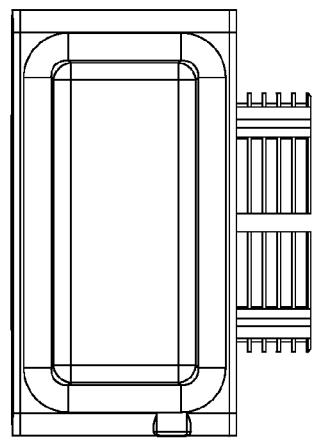
FIG. 26C is a back schematic view of the electronic end cap of the present invention that generates olfactory stimuli.
Figure 26D:
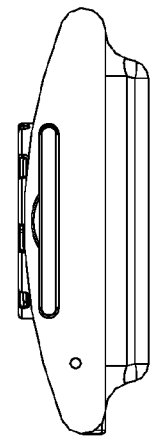
FIG. 26D is a bottom-side schematic view of the electronic end cap of the present invention that generates olfactory stimuli.
Figure 26B:
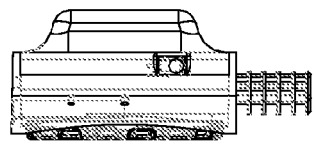
FIG. 26B is a top-side schematic view of the electronic end cap of the present invention that generates olfactory stimuli.
Figure 26A:
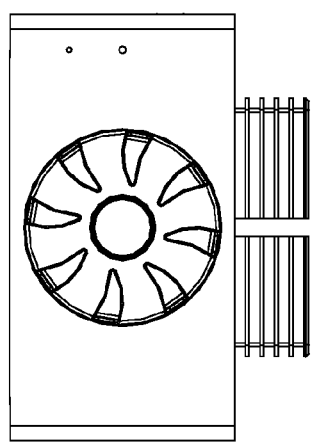
FIG. 26A is a front schematic view of the electronic end cap of the present invention that generates olfactory stimuli.

FIG. 24 shows a rear view, including battery compartment 250. The batteries are accessed through a side door structure 260, as indicated in FIG. 25. Side door access obviates any need to remove the note board assembly 200 during battery replacement. FIGS. 26A-D show a schematic view of the electronic end cap of the present invention that generates olfactory stimuli.

The doors and door handles that the display ads for door handles providing multisensory stimuli invention can be used for come in various sizes, shapes and surface topographies. For example, some door handles will have high curvature while others will have a lower curvature. What is needed, therefore, is a universal door handle accessory attachment system which allows display assemblies of various sizes and surface topographies to be affixed to doors and door handles that have similarly diverse sizes and shapes.

Figure 28:
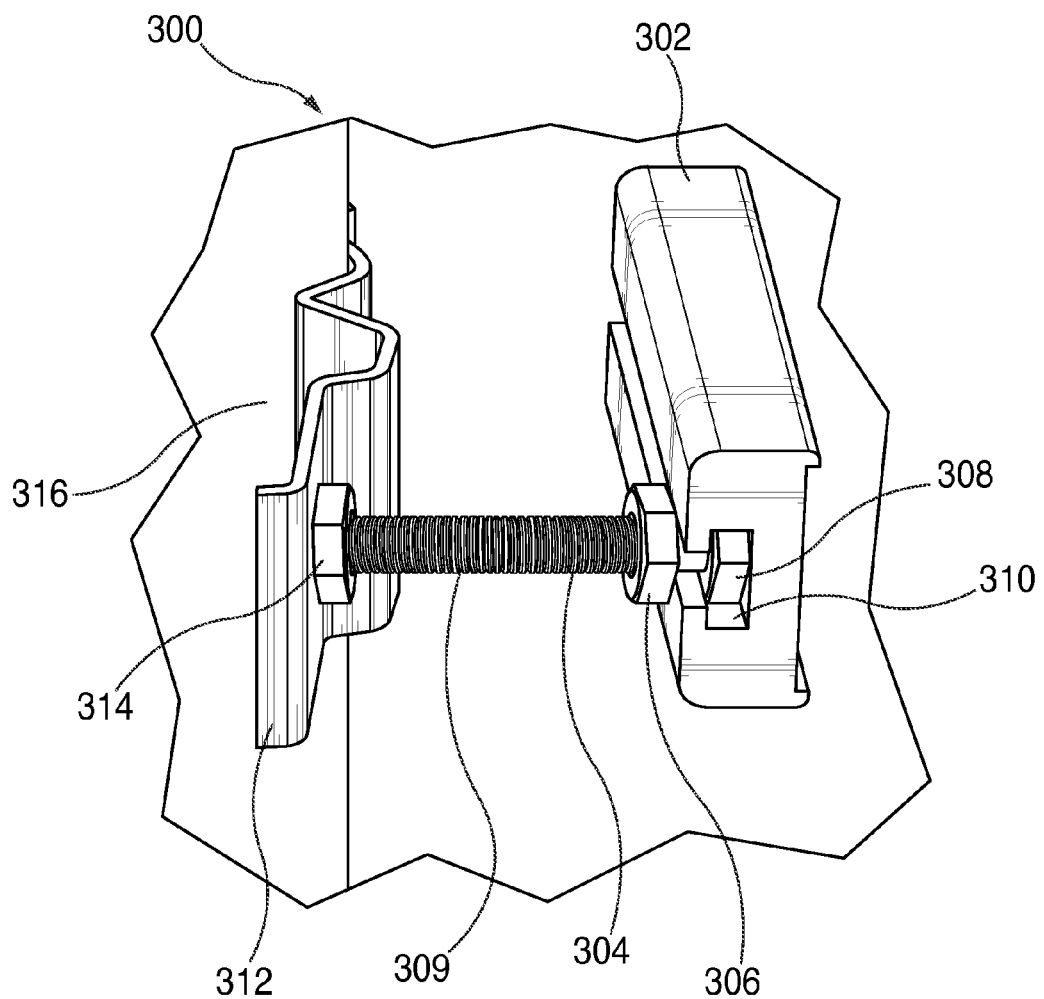
FIG. 28 is a side view of a universal door handle accessory attachment system.

FIG. 28 shows a side view of a universal door handle accessory attachment system 300. The system 300 is used to affix a door handle accessory of the type described above to an existing door handle. The attachment system 300 is universal because it can be used to attach any style of door handle display accessory to any shape style of existing door handle. In the preferred embodiment, the universal door handle accessory attachment system 300 comprises a block 302, which is affixed to a rear portion of a door handle 320 (shown in FIG. 2). To install the system 300, a head 308 of head bolt 304 is inserted into a slot 310 of the block 302. The head bolt contains both a head 308 and a shaft 309. The slot 310 allows the bolt 304 to be adjusted side-to-side within the block 302, accommodating for various widths of doors, door handles and door handle accessories. In a preferred embodiment and as is shown in FIG. 28, the block 302 is approximately 2 inches long, 1 inch wide and ¼ inches thick. The slot 310 is located in the center of the side of the block 302, and develops into a furrow within the block 302. When the bolt head 308 is within the slot 310, the bolt 304 is not allowed to turn during tightening. The bolt 304 is a type of fastening screw 55. Also shown on the bolt 304 is a block nut 306 and clip nut 314. During tightening, the block 302 is held in place, typically with an open-end wrench, and the clip nut 314 is pushed against the multi-bended clip 312 and then the flat of the back-inside of the accessory 316. Also during tightening, the block nut 306 is pushed against the block 302, affixing the head bolt 304 to the block 302 by locking the head 308 of the head bolt 304 into position in the block slot 310. The multi-bended clip 312, which compresses the accessory against the door handle, can be made of various materials including spring steel or aluminum. The multi-bended clip 312, which will be discussed in more detail below, is constructed so as to be able to conform to various curvatures of the door handle accessory 316. The multi-bended clip 312 must compress tight enough to be secure against the accessory 316, and a fairly wide clip width is preferred. In the preferred embodiment, the head bolt 304 will be breakaway, so that if it is too long and sticking out of the face of the accessory, the excess will break off easily above an accessory nut 322 (shown in FIGS. 31 and 32). Like the bolt head 308, the clip 314 and block 306 nuts are typically hexagonal.

Figure 29:
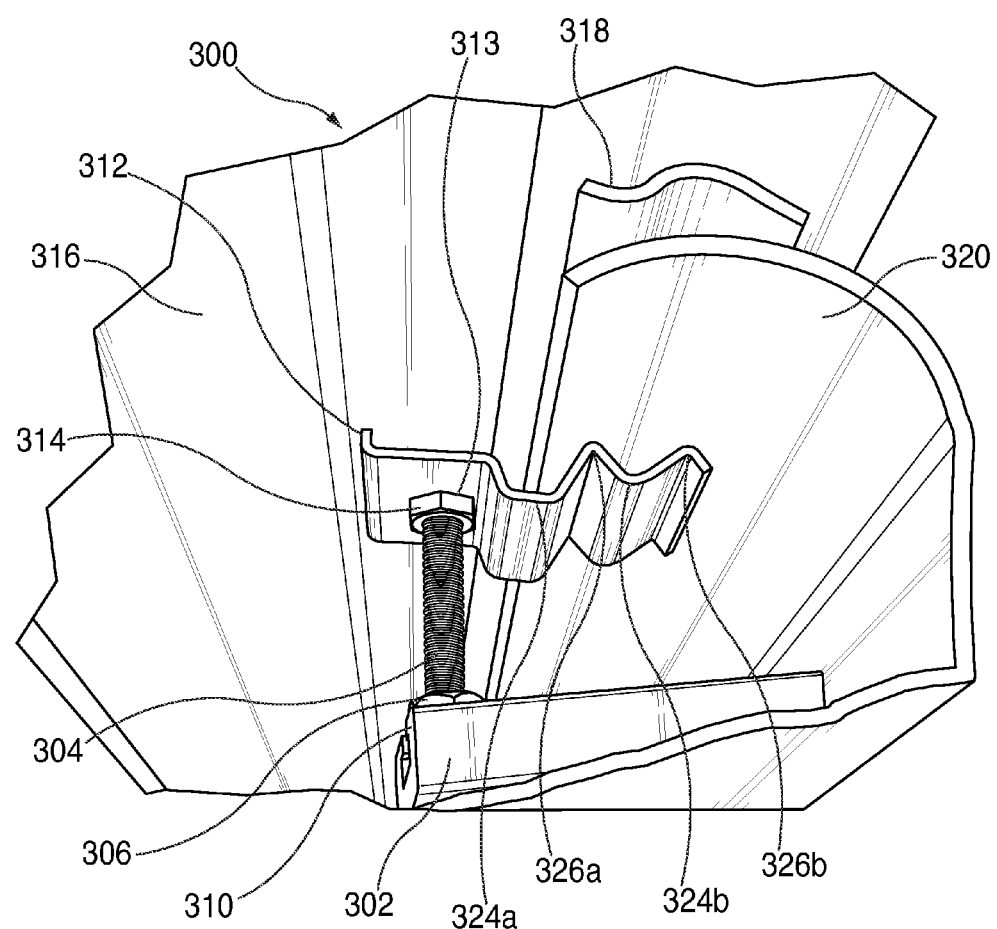
FIG. 29 is a top view of the universal door handle accessory attachment system.

FIG. 29 is a top view of the attachment system 300 with the accessory 316 facing outward, i.e., the graphical display is facing outward. Shown in FIG. 29 is accessory foam double stick tape 318, which in the figure is used to affix the accessory 316 to the door handle 320. Accessory foam double stick tape 318 of this kind can also be used to hold the accessory 316 and handle 320 in place during installation of the attachment system 300. As can be seen in FIG. 29, the tape 318 is malleable, conforming to the particular topographical surface of the accessory 316 and handle 320. The multi-bended clip 312 is tightened against the accessory 316 and the door handle 320, after tightening of the clip lock 314 in a clockwise direction. Here, the multi-bended clip 312 is approximately ½ inches long, 1.5 inches wide, and 1/20 inch thick. However, because the multi-bended clip 312 is wave-shaped, it has a virtual depth of approximately ¼ inches. The wave of the multi-bended clip 312 forms two apexes 324a and 324b, which are designed so that the clip 312 will fit with a multitude of door handles 320, contributing to the universality of the attachment system 300. In FIG. 29, one apex 324a has a height of about ¼ inch, while the other apex 324b has a height of about ⅛ inch. Some door handle edges will fit into the cavity formed by apex 324a, while others will fit into the cavity formed by apex 324b. Because of the particular curvature of the door handle 320 in the figure, the edge of the door handle fits neatly into apex 324a cavity. Also shown are two clip vales 326a and 326b formed from the wave structure of the multi-bended clip 312. While the apex 324 allows the door handle edge to fit into the clip 312, in this case, both vales 326a, 326b abut the door handle 320, further securing the door handle 320 to the accessory 316. If the vales were not curved, then the attachment would not be as secure. In some cases, depending on the shape of the door handle, only one of the plurality of vales will abut the door handle 320. As the clip nut 314 tightens the multi-bended clip 312 to the accessory 316 through the clip aperture 313, the vales are also tightened/compressed against the door handle 320. Also shown in FIG. 29 is the head bolt 304, block nut 306, block 302, and slot 310.

Figure 30:
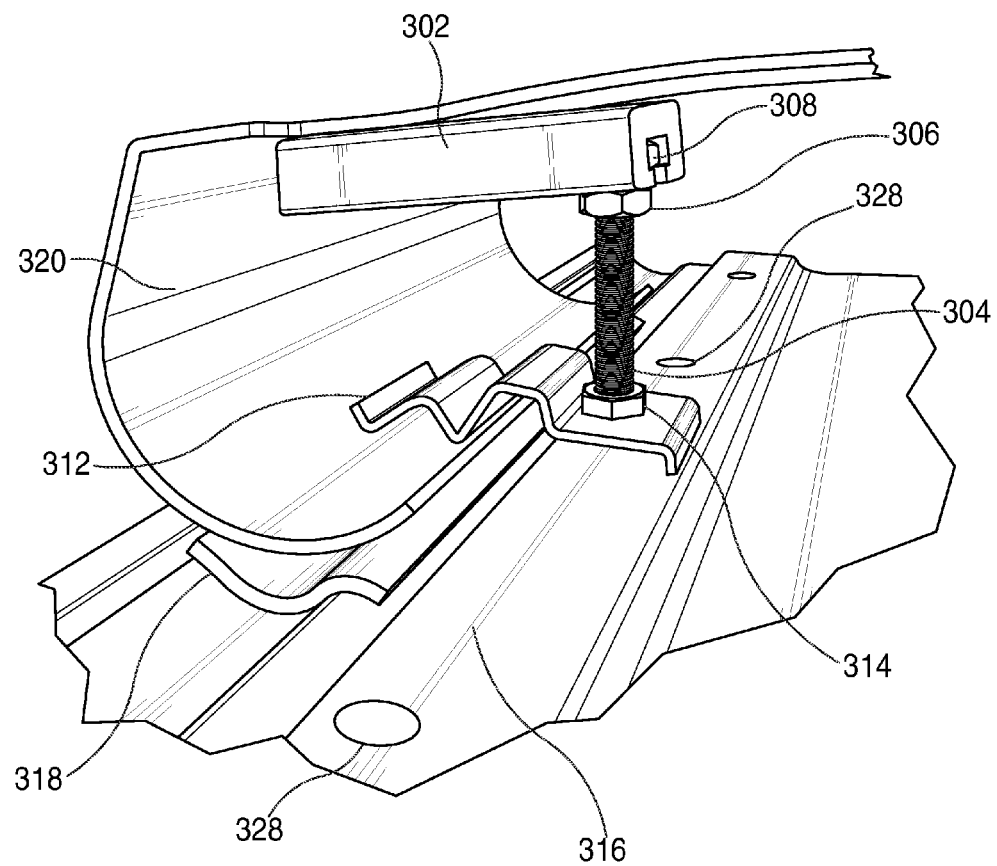
FIG. 30 is a different top view of the universal door handle accessory attachment system.

FIG. 30 is a top view of the installed attachment system 300. Visible in FIG. 30 are at least two accessory apertures 328 (or 50), into which the head bolt 304 (fastening screw 55) is inserted. The accessory apertures 328 are spaced at different intervals along the back (and height) of the handle accessory. The intervals are typically between 8 and 14 inches. This allows the accessory 316 to be placed at higher or lower orientations relative to the door handle 320 itself. The decision of which aperture to screw the head bolt 304 in can be based on a different factors, such as wanting to differentiate sale items, and can change periodically or seasonally. Also seen is the curvature of the accessory foam double stick tape 318 varying in a wave shape to accommodate the varying surface of the door handle 320. The block 302 is shown in the Figure, having a length of about 2 inches. It is usually the case that doors and door handles (both rear and front portions) will be of a particular size, but will vary in width of about two inches. This is why the block 302 is of that size (2 inches length) in this embodiment. Of course, the length of the block 302 can be larger or smaller. The important feature is that the head bolt 304 can be adjusted within the block 302 going from side-to-side.

Figure 31:
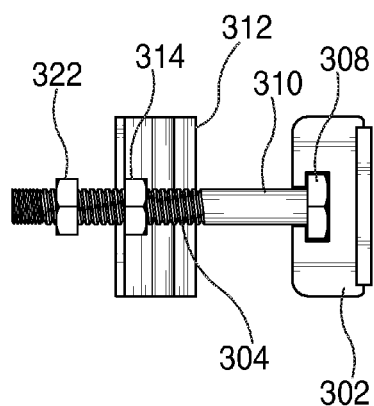
FIG. 31 is a schematic of an example universal door handle accessory attachment system, viewing from the side.
Figure 32:
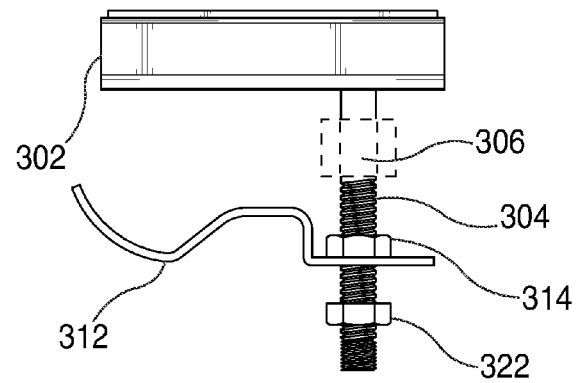
FIG. 32 is a schematic of an example universal door handle accessory attachment system, viewing from the top.
Figure 33:
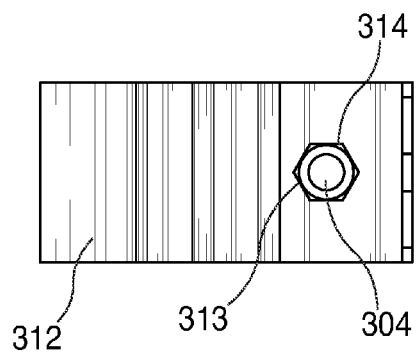
FIG. 33 is a schematic of an example universal door handle accessory attachment system, viewing from the side.

FIGS. 31-33 are drawn-to-scale schematics of the universal door handle accessory attachment system 300 and multi-bended clip 312. FIG. 31 is the universal attachment system 300 viewed from the side. Visible is an accessory nut 322. When the attachment system 300 is fully configured, the accessory is compressed between the multi-bended clip 312 and the accessory nut 322. As can be seen, the head 308 takes up approximately ⅓ of the width of the block 302. The block 302 fits snugly around the perimeter of the bolt 304, so that the bolt 304 does not turn when tightening the clip nut 314 and accessory nut 322. The shaft 309 of the head bolt 304 comprises a screw portion and a flat portion. The screw portion makes up the bottom half of the bolt (left side in FIG. 31) and is where the clip nut 314 and accessory nut 322 turn to compress the multi-bended clip 312 against the accessory 316. While the flat portion makes up the top half of the bolt 304 (right side) whose surface enables the block 302 to remain stationary against it so that it does not turn while tightening the nuts. The total virtual depth of the clip 312, i.e., the top of the highest apex and bottom of the lowest vale, is shown to take up approximately ¼ of the total length of the head bolt 304. The head bolt 304 is about an inch long. Typically the head 308 has a larger diameter than clip 314 and accessory 316 nuts. The head 308 is of a size such that when inserted into the slot 310 of the block 302, it provides sufficient leverage to keep the bolt 304 in place during the tightening of the nuts. The bolt 304 extends about ⅙ inch out from the accessory nut 322, but will not be visible since it will fit inside the internal structure of the accessory. Better yet, since the bolt is breakaway, the bolt 304 will break off from the left of accessory nut 322. The total distance, from the bottom of the bolt 304 to the top of the block 302 is approximately 2 inches.

FIG. 32 is a schematic view of the universal door handle accessory attachment system 300, viewing from the top. The Figure highlights the relative difference in thickness, in this embodiment, between the block 302 and the multi-bended clip 312, as the block 302 is more than 5 times as thick as the multi-bended clip 312. The block 302 is about 0.5 inches thick. Shown in FIG. 32 is the block nut 306, which secures against the block 302, is hexagonal, and about 3 times as thick as the clip 314 and accessory 322 nuts. In this Figure the multi-bended clip 312 has only one apex 324 and one vale 326. Even so, the attachment system 300 is still universal and can be configured with a variety of door handles and accessories. The single apex and vale allow the multi-bended clip 312 (and overall, the attachment system 300) to conform to a variety of different accessory and door handle shapes. Here, the amplitudes of the clip apex 324 and vale 326 give it an overall virtual depth of about the same thickness as the block 302. The total distance from the left-most edge of the multi-bended clip 312 to the right-most edge (beginning of apex to end of vale) is approximately 1.5 inches, while the total width of the attachment system 300 itself (top of block to bottom of bolt) is 2 inches, or the same width of the block 302 and clip 312.

FIG. 33 is a schematic view of the mutli-bended clip 312, viewing from the side. The clip 312 contains a clip aperture 313 and is approximately 1 inch long and 2 inches wide. The bolt 304 is screwed in from the other side of the multi-bended clip 312, and fits into the center right-side of the multi-bended clip 312 approximately ⅛ inch from the right.

Figure 34:
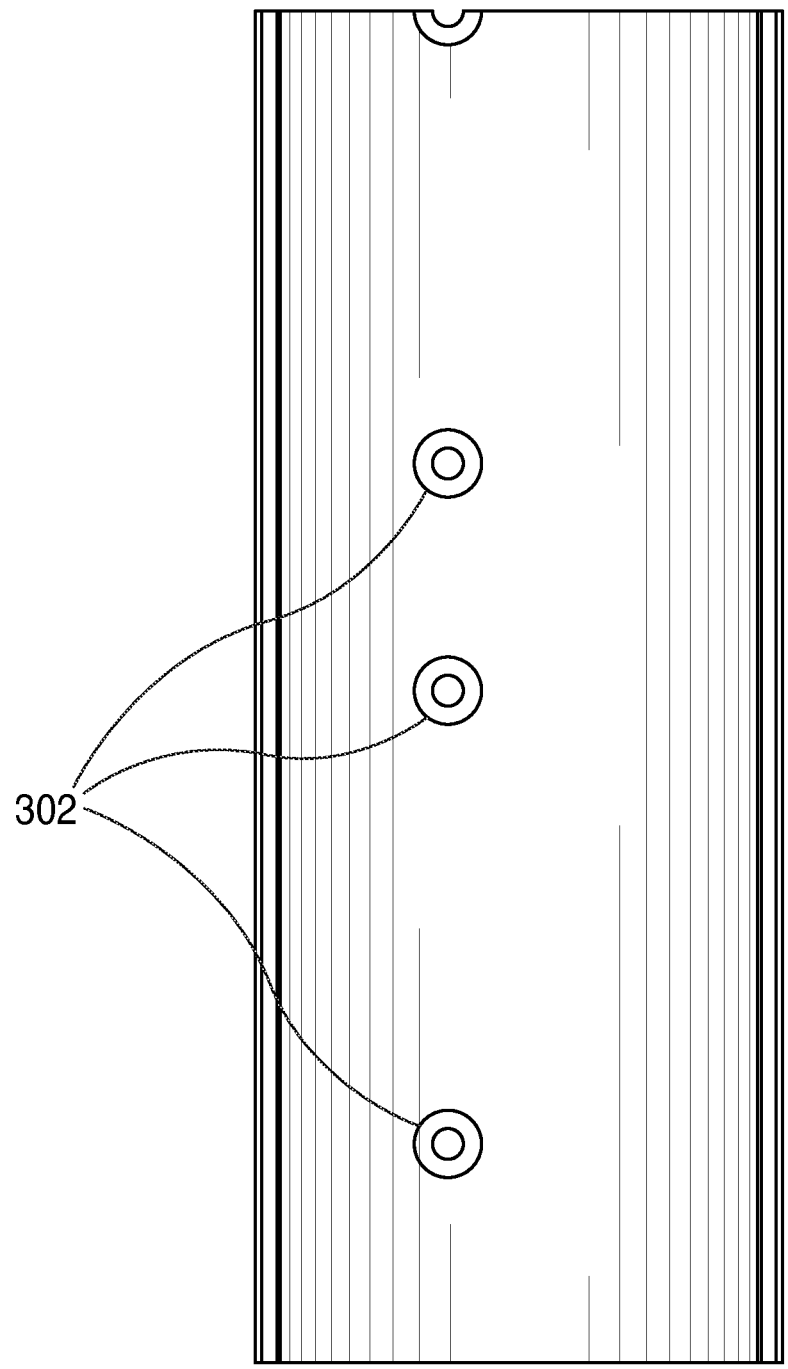
FIG. 34 is a schematic view of an example accessory.

FIG. 34 is a view of the accessory previously disclosed, and highlights the relative spacing of the accessory apertures 328 into which the attachment system 300 is positioned. Here, the apertures 328 are spaced at unequal distances. In the Figure, the distance from the top of the accessory to the first aperture is 2 inches, then 5 inches to the next aperture, 1.5 inches to the next aperture, and then another 5 inches to the bottom of the accessory 316. Of course, other embodiments can consist of other distances between the apertures. The distances between the apertures allow the installer to adjust the accessory to be of varying height orientations, depending on the desired visual, audio or olfactory effect for advertising. Each aperture has a diameter of about 0.5 inches.

A user would typically install the attachment system 300 as follows. First the user would eyeball the door and door handle 320 to determine where along the slot 310 the head bolt 304 would be placed width-wise along the slot 310, and insert the head bolt 304 into the slot 310 accordingly. The user would then twist the block nut 306 to affix the head bolt 304 to the block 302 by locking the head 308 of the head bolt 304 into position in the block slot 310. The user then places the clip nut 314, multi-bended clip 312 via the clip aperture 313, and accessory nut 322 onto the head bolt 304, in that order. Then, the user places the block 302 onto the rear portion of the door handle 320, securing this placement using block foam double stick tape 334 (not shown), while simultaneously securing the multi-bended clip 312 to the handle portion of the door handle 320, making sure the cavity of the multi-bended clip apex 324 contains the door handle edge, and inserting the head bolt 304 into the accessory aperture 328. Beforehand, the user decides which of the apexes 324 of the multi-bended clip 312 the door edge will fit into, based on the curvature of the door handle 320. The user also secures the door handle 320 to the accessory 316 using the accessory foam double stick tape 318. Finally, the user twists the pair of nuts, the clip nut 314 and the accessory nut 322, to simultaneously affix the accessory 316 to the multi-bended clip 312 and the multi-bended clip 312 to the door handle 320, pushing the head bolt 304 or block nut 306 against the block 302 while pushing the multi-bended clip 312 against the door handle 320 and the accessory 316.

Figure 35:
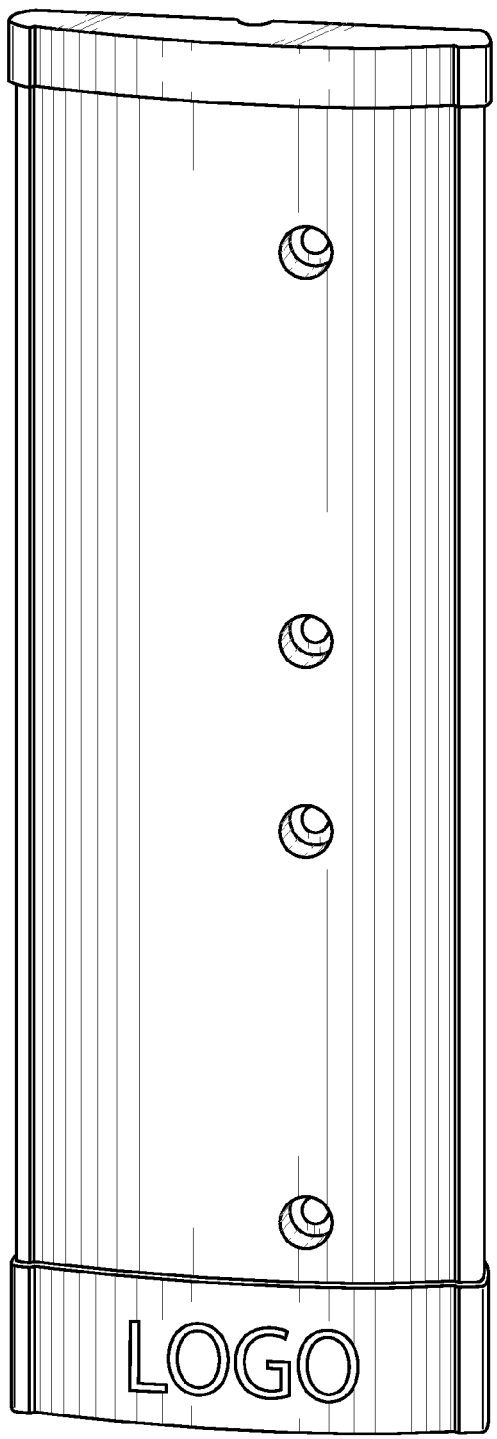
FIG. 35 is an example accessory with logo on the endcap.
Figure 36:
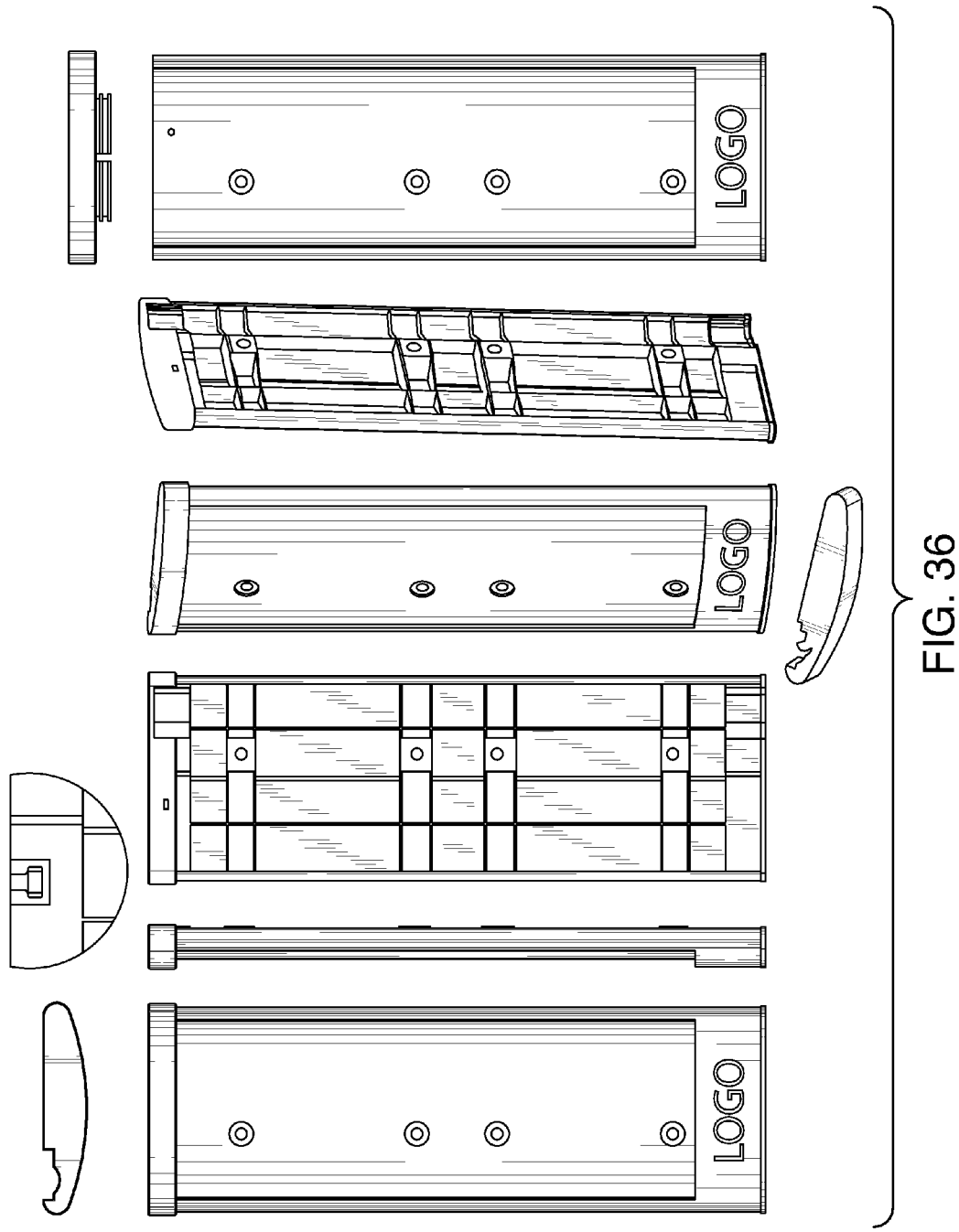
FIG. 36 shows generally an accessory with logo on the endcap.

Referring now to FIGS. 35 and 36, another embodiment of the invention contains the improvement of a logo supplied by any known means on the surface of the endcap proximal to the consumer. An additional embodiment shown in the accompanying drawings contains the improvement of a logo supplied by any known means on the surface of the display assembly, above or below where the plexiglass would go. Such logos are hereinbefore described may be advertising logos, but they may be any words or images desired to be communicated to consumers.

While the invention has been described with particular reference to specific embodiments, it will be apparent to those skilled in the art that the same principles may be used in similar arrangements. The invention is not limited to the precise structures described. Various changes and modifications may be made without departing from the spirit and scope of the invention as defined by the claims below.

I claim:

1. A universal door handle accessory attachment system comprising:
   an accessory having an accessory aperture;
   a multi-bended clip having a clip aperture and a curved length extending away from the clip aperture;
   a head bolt with a shaft and a head, the shaft diameter sufficient to pass through the accessory aperture and the clip aperture, the shaft terminating in an accessory end, whereby the head diameter is larger than the shaft diameter;
   a pair of nuts positioned along the shaft in the vicinity of the accessory end and placing the accessory and the multi-bended clip into a fixed distance from one another, whereby the head bolt passes through both the accessory aperture and the clip aperture;
   a block comprising a slot into which the head of the head bolt may slideably engage; and
   a block nut positioned along the shaft in the vicinity of the head and affixing the head bolt to the block by locking the head of the head bolt into position in the block slot;
   whereby the pair of nuts is capable of simultaneously affixing the accessory to the multi-bended clip and affixing the multi-bended clip to a door handle along its curved length extending away from the clip aperture, by pushing the head bolt or block nut against the block while pushing the multi-bended clip against the door handle and the accessory.

2. The universal door handle accessory attachment system of claim 1, wherein the multi-bended clip comprises at least one apex and at least one vale, each of various amplitudes, wherein the at least one apex and at least one vale are rounded to accommodate for the various curvatures of door handles to which the clip is affixed.

3. The universal door handle accessory attachment system of claim 2, wherein a cavity of one of the at least one apex houses an end of a handle when the system is installed.

4. The universal door handle accessory attachment system of claim 2, wherein a tip of one at least one vale is tightened against the curved door handle when the system is installed.

5. The universal door handle accessory attachment system of claim 1, wherein the system further comprises accessory foam double stick tape to affix the accessory to a handle portion of the door handle, and that which malleably conforms to the surface topography of the display surface and handle portion of a door handle, and serves to hold the accessory against the door handle during installation.

6. The universal door handle accessory attachment system of claim 1, wherein the system further comprises block foam double stick tape to affix the block to a rear portion of the door handle, and serves to hold the block against the rear portion of the door handle during installation.

7. The universal door handle accessory attachment system of claim 1, wherein the block prevents the head bolt from turning while one or more of the pair of nuts are turned to install the system.

8. The universal door handle accessory attachment system of claim 1, wherein the head bolt is breakaway, so if it is too long and sticks out of the accessory, the excess will break off easily above the nut of the pair of nuts closest to the accessory.

9. The universal door handle accessory attachment system of claim 1, wherein the head bolt comprises a screw portion along its shaft, onto which the pair of nuts are positioned.

10. The universal door handle accessory attachment system of claim 1, wherein the pair of nuts comprises a clip nut to secure the multi-bended clip.

11. The universal door handle accessory attachment system of claim 1, wherein the pair of nuts comprises an accessory nut to secure the accessory.

12. The universal door handle accessory attachment system of claim 1, wherein the pair of nuts and block nut are hexagonal.

13. The universal door handle accessory attachment system of claim 1, wherein the accessory comprises a display assembly for displaying advertisements.

14. The universal door handle accessory attachment system of claim 13, wherein the display assembly comprises:
- a display assembly surface comprising opposing lip flanges, for receiving a display advertisement insert;
- a top end cap and a bottom end cap, comprising fins that engage the display assembly using a friction fit, and that cooperates with the lip flanges to contain said insert along the surface.

* * * * *